(12) United States Patent
Wechsler et al.

(10) Patent No.: US 10,783,183 B2
(45) Date of Patent: Sep. 22, 2020

(54) SYSTEMS AND METHODS FOR DRIVING GRAPH STRUCTURE AND BEHAVIOR USING MODELS

(71) Applicant: AT&T Intellectual Property I, L.P., Atlanta, GA (US)

(72) Inventors: Chesla C. Wechsler, Ocean County, NJ (US); Jeffrey Polhemus, Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 521 days.

(21) Appl. No.: 15/364,540

(22) Filed: Nov. 30, 2016

(65) Prior Publication Data

US 2018/0150569 A1    May 31, 2018

(51) Int. Cl.
  *G06F 16/00*   (2019.01)
  *G06F 16/901*  (2019.01)
  *G06F 16/21*   (2019.01)

(52) U.S. Cl.
  CPC ........ *G06F 16/9024* (2019.01); *G06F 16/212* (2019.01)

(58) Field of Classification Search
  CPC ............................ G06F 16/9024; G06F 16/212
  See application file for complete search history.

(56) References Cited

U.S. PATENT DOCUMENTS

| | | | |
|---|---|---|---|
| 7,456,840 B2 | 11/2008 | Molesky et al. | |
| 7,644,146 B2 | 1/2010 | Huberman et al. | |
| 8,027,273 B2 | 9/2011 | Nguyen | |
| 8,400,444 B2 | 3/2013 | Farmanbar et al. | |
| 8,694,905 B2 | 4/2014 | Boykin et al. | |
| 9,087,088 B1* | 7/2015 | Bose | G06Q 30/0276 |
| 9,158,871 B2 | 10/2015 | Neergaard | |
| 9,166,888 B1 | 10/2015 | Brockbank et al. | |
| 2010/0318931 A1* | 12/2010 | Boykin | G06F 3/0482 |
| | | | 715/771 |
| 2012/0113868 A1* | 5/2012 | Cummings | H04W 8/22 |
| | | | 370/255 |
| 2012/0209886 A1* | 8/2012 | Henderson | G06F 16/273 |
| | | | 707/798 |
| 2014/0019490 A1* | 1/2014 | Roy | G06F 16/2228 |
| | | | 707/798 |
| 2014/0317299 A1* | 10/2014 | Teather | G06F 9/5072 |
| | | | 709/226 |
| 2015/0121401 A1 | 4/2015 | Laredo et al. | |
| 2015/0131524 A1 | 5/2015 | Cavalcante et al. | |
| 2015/0220311 A1 | 8/2015 | Salter | |
| 2016/0050116 A1 | 2/2016 | Sheshadri et al. | |
| 2016/0054982 A1 | 2/2016 | Itani et al. | |
| 2017/0199875 A1* | 7/2017 | Nevrekar | G06F 16/24578 |

(Continued)

*Primary Examiner* — Mark D Featherstone
*Assistant Examiner* — Kweku William Halm
(74) *Attorney, Agent, or Firm* — BakerHostetler

(57) ABSTRACT

Systems and methods are disclosed for creating and managing graph structures using models. A model-driven graph can include a first model node, a second model node, and a first model edge. The nodes can be defined according to at least respective schemas and at least one model utilizing the schemas. Elements can include data related to the aspects represented by the node elements. The edges can be defined according to at least schemas including data of nodes associated with the edge, with the relationships defined by edge schemas or the model(s).

19 Claims, 21 Drawing Sheets

(56) References Cited

U.S. PATENT DOCUMENTS

2017/0221240 A1\* 8/2017 Stetson ................. G06T 11/206
2017/0279687 A1\* 9/2017 Muntes-Mulero .... H04L 41/145
2017/0288940 A1\* 10/2017 Lagos .................... G06F 16/21

\* cited by examiner

US 10,783,183 B2

SYSTEMS AND METHODS FOR DRIVING GRAPH STRUCTURE AND BEHAVIOR USING MODELS

TECHNICAL FIELD

The disclosure herein generally relates to graph structures, and more particularly relates to model-driven graph structures.

BACKGROUND

A variety of techniques exist for organizing resources, describing relationships, and otherwise storing data about things represented electronically. One such technique is the use of graph structures as an abstract data type.

Existing graph structures include nodes and edges but are generic in nature which limits their uses due to inconsistencies and configuration difficulties. For example, graphs do not enforce rules about what elements may be connected or related, and do not ensure that all elements sharing common information store or present the common information in a consistent fashion. As a result of these limitations, configuration of existing graph structures is made more difficult and queries (or other operations) to or using existing graph structures may not return accurate, complete, or uniform results. These limitations necessitate substantial testing before graphs are implemented in production and increase risk with entering "on the fly" changes to the structure in production.

SUMMARY

In an embodiment, a system includes a processor and a non-transitory computer-readable media storing computer-readable instructions that, when executed by the processor, cause the processor to perform a method. This method can include receiving a first node schema definition associated with a first object, receiving first object data associated with the first object, and populating the first object data to a model first node according to the first node schema definition. The model first node is an instance of the first model node. This method can further include receiving a second node schema definition associated with a second node, receiving second object data associated with the second object, and populating the second object data to a model second node according to the second node schema definition. The model second node is an instance of the second model node. This method can further include receiving a first edge schema definition associated with a first edge between the first object and the second object, receiving relationship data associated with the first object and the second object, and populating the relationship data to a model first edge according to the first edge schema definition. The first model edge is an instance of the first edge schema, defining a model-driven graph structure according to at least the model first node and the model second node connected by the model first edge.

In an embodiment, a method includes receiving a first node schema definition associated with a first object, receiving first object data associated with the first object, populating the first object data to a model first node according to the first node schema definition, the model first node is an instance of the first model node, receiving a second node schema definition associated with a second node, receiving second object data associated with the second object, and populating the second object data to a model second node according to the second node schema definition. The model second node is an instance of the second model node. The method further includes receiving a first edge schema definition associated with a first edge between the first object and the second object, receiving relationship data associated with the first object and the second object, and populating the relationship data to a model first edge according to the first edge schema definition. The first model edge is an instance of the first edge schema, defining a model-driven graph structure according to at least the model first node and the model second node connected by the model first edge.

In an embodiment, a system comprises a model-driven graph. The model-driven graph includes a first model object representing a first object in the model-driven graph. The first model object is described according to a first node schema definition and first object data associated with the first object. The model-driven graph further includes a second model object representing a second object in the model-driven graph. The second model object is described according to a second node schema definition and second object data associated with the second object. The model-driven graph also includes a first model edge between the first model object and the second model object in the model-driven graph. The first model edge is described according to a first edge schema definition and relationship data associated with the first object and the second object.

In embodiments, non-transitory computer readable media can store instructions for performing or causing aspects disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Aspects herein are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1A:
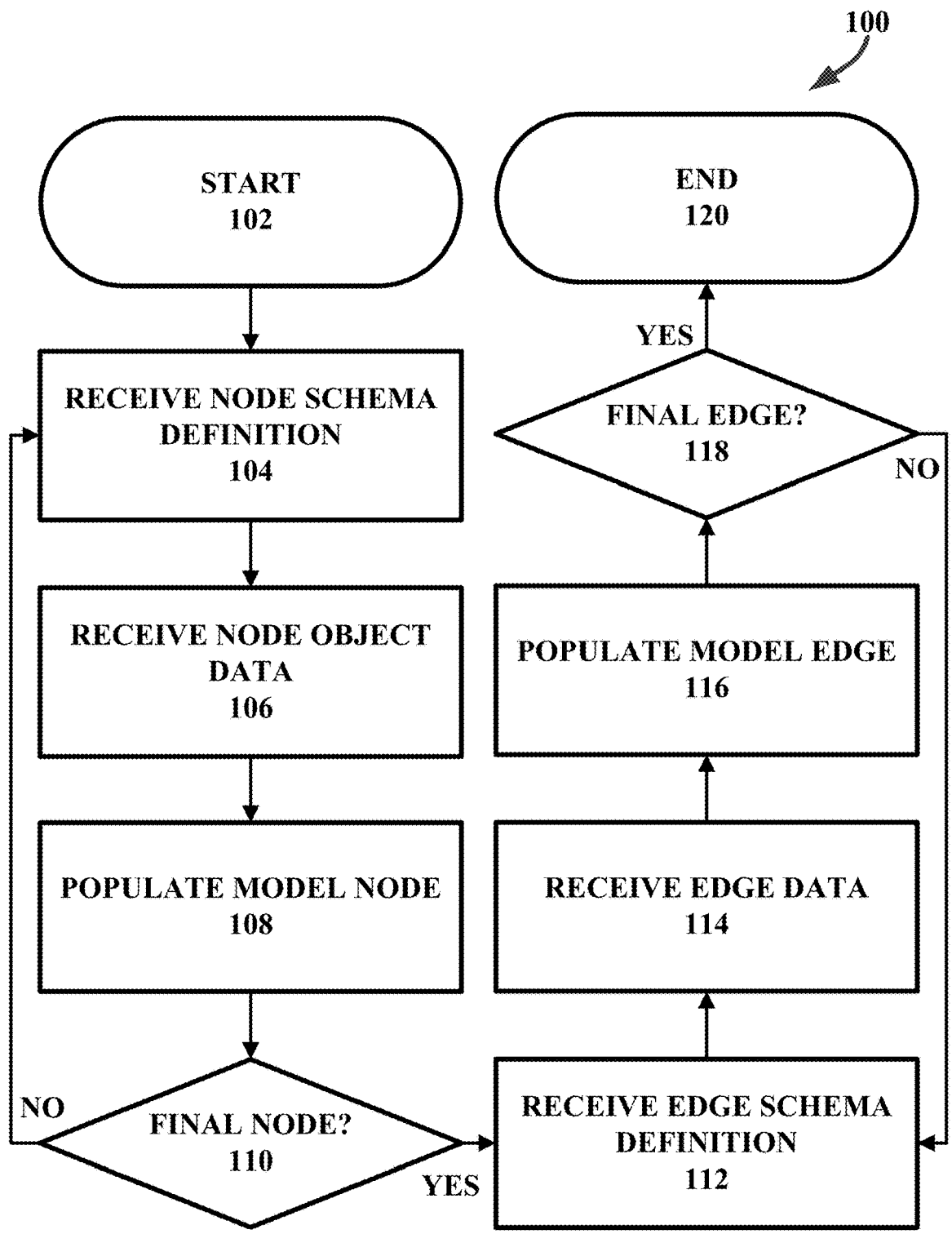
FIGS. 1A and 1B display block diagrams of example methods for managing model-driven graph structures.

As used herein, a model-driven graph or model-driven graph structure is a data type or data structure representing directed or undirected graphs such that each graph element—e.g., a node or edge—is based on a schema that accords with the graph model describing its organization in the graph. Nodes can represent physical or logical entities, for which one or more models may exist, and edges can represent relationships or other information related to the nodes with which they interact or, in embodiments, the edges themselves.

Models of model-driven graph structures, and the schemas of the model describing graph elements, can be used to define and impose valid data, content, or attributes associated with elements. They can, for example, define valid attributes for edge types, define valid or allowed edges between node types, define resource or service information for the entire graph or subgraphs, and be "ingested" (e.g., imported to the system, as-formatted or based on re-formatting/conversion) and advise runtime behavior of systems using, within, or related to the model-driven graph structure.

Model-driven graphs can be used, in various embodiments, in any arrangement used by graphs in computer science, mathematics, or other fields and/or specific applications which use graph-type data structures. Nodes can represent physical or logical elements. Logical node elements may contain other node information, such as identifying groups or classes of nodes or containing information pertinent to other nodes. Edges identify at least relationships between nodes. In model-driven graphs, schemas exist for each type of edge and each type of node, or for individual edges and nodes which are their own respective types. The model(s) and/or associated schemas can contain metadata and other information which can be used by specific services or leveraged through application programming interfaces (APIs).

New elements can be added to model-driven graphs by adding the elements to the graph and associating the schema information. The schema information may be stored with the information representing the element within the graph or schema information may be referenced thereby and stored in another manner. New elements can be discovered or manually added, and configuration can occur in accordance with the model and their respective schema. The use of schemas within the graph model(s) can assist with standardization and configuration where a variety of disparate elements exist in a graph, and ensures consistency among common types of elements.

Models (or schemas within models) can also be changed in a manner that allows updating of elements and the graph while maintaining consistency and reducing the number of individual actions to be taken during an update. Changes to models or schemas of a model-driven graph can be made on the fly, and graph behavior (or the behavior of elements therein) changes as the model and/or schema update propagates through the graph. Language and metadata used in describing the model or schemas of the model can also be converted using organic graph service capability or resources available to the graph. In this fashion, a later version or update can be propagated such that any changes to models, schemas, or related data are instructed for completion or automatically completed. Further, reverse-compatibility (e.g., either by re-conversion or retention of earlier versions) can be included in the event the graph includes or interacts with non-modeled entities which are noncompliant with the update.

Arrangements using model-driven graph structures can reduce or eliminate development and test cycles. System algorithms and modules interoperable with models can allow for new and existing frameworks to be generated, modified, or torn down, and/or for local, network, cloud, or other resources to be added, changed, or deleted, in an "on the fly" manner by leveraging the consistency provided by the models.

In some embodiments, a data dictionary can define simple and complex types used in the model. Definitions can include, e.g., type name, type description, primitive type, type in model, and rules concerning validation, use, or content. In alternative embodiments, no data dictionary is employed or included in a model-driven graph structure.

Rules related to the model or schemas therein can specify or constrain attributes or other information related to a model (e.g., mandatory, cardinality, choices).

Models and schemas therein can include context tags as described hereafter. Context tags can include forms of metadata flagging or directing particular information of or related to context tags to services or other elements interested in the information.

As used herein, a node schema or edge schema is a schema for a particular type of node or edge, of which one or more instances may exist in a graph. Definitions of node schemas and/or edge schemas define these models. A model node or model edge is an instance of an element according to the respective node schema or edge schema. Object data is data associated with any element of a graph. Relationship data is data which describes a relationship of an element of a graph (e.g., to another element, to itself). Object data and/or relationship data can be any data and need not conform to a particular format (e.g., need not be object oriented).

In embodiments, models can exist within models, or be reused inside other models. A model may contain other instances of the same or different models in embodiments. Likewise, schemas can contain schemas, including conceptualized or instantiated elements of the same or difference schemas.

Different elements can be defined differently in schemas based on relationships in addition to aspects of the element in isolation. In a non-limiting example, a model-driven graph can contain two services, Service A and Service B. Both are concerned with the relationship between a virtual function (vf) and a physical server (pserver). Service A, however, is indifferent to virtual servers (vserver) used, whereas Service B is interested in virtual servers used. Both services can reuse the same virtual function schema within the model. Service B, but not Service A, would also use a virtual server schema within the model. An example of relationships and schemas can thus be represented by:

Service A: vf—uses→pserver

Service B: vf—uses→vserver—uses→pserver

Within the model-driven graph of this example, an instance of Service A can be validly created without virtual server information (including a virtual server schema), with a subgraph showing an edge between the virtual function node and the physical server node. In contrast, an instance of Service B so created would be invalid.

In embodiments, different versions of the same schema may be permitted in a model-driven graph structure. This can be accomplished using, in embodiments, an invariant identifier and version information (e.g., a version identifier). This information allows correlation to the appropriate data for reliable and consistent usage. For multi-version schemas, a master or parent schema can exist in embodiments to assist with version control and ensure all versions are organized for querying and/or utilization.

Figure 1B:
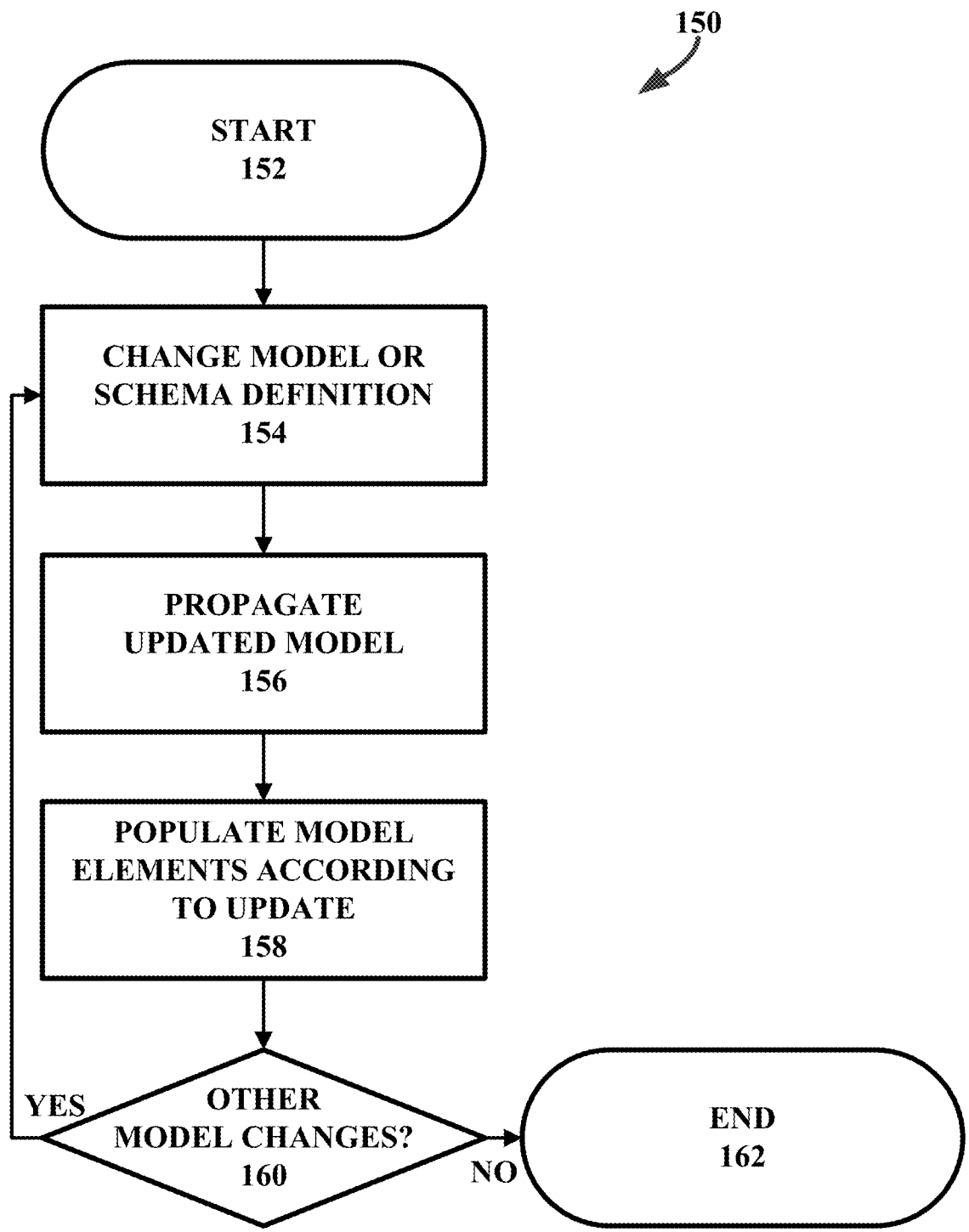

FIGS. 1A and 1B illustrate example methodologies for developing and managing model-driven graph structures. Specifically, FIG. 1A illustrates an example methodology 100 for developing a model-driven graph structure. Methodology 100 can be used to create a new model-driven graph structure, or add elements to an existing model-driven graph structure. Methodology 100 and the associated model-driven graph structure provide for simple and consistent configuration of the graph and elements contained therein. Methodology 100 begins at 102 and proceeds to 104 where node schema definitions are received.

At 106, node object data is received. In embodiments alternative to that illustrated object data may be received first (e.g., through discovery in an environment, automatic provisioning, manual input) and identified to correspond to a particular node schema definition. The data receive can be determined to be represented within the model-driven graph structure as a node, and a node schema definition can be located for the particular type or class of node.

At 108, a model node (e.g., instance of the node schema) is populated based on the node object data received at 106. This includes logical arrangement within the model-driven graph structure with respect to other graph elements. Rules as to the type of data included and formatting of such data are applied to ensure the new or changed node in the graph corresponds to the node schema definition and any other model(s) (including, but not necessarily, a global or graph-wide model) of the model-driven graph.

With regard to node schemas, edge schemas, and others, models herein may comply with representation state transfer (REST) models, or be RESTful, to facilitate interoperability and use with application programming interfaces (APIs). In this regard, information contained within the schemas and/or models may be language-agnostic and usable according to a variety of programming techniques. In embodiments, a modeling language can be employed common to models.

The schemas (and/or model(s)) may include a context tagging to further aid in identifying and directing information contained therein. For example, a context tag such as "(@inventory [more])" could be employed to direct the metadata contained in "[more]" to inventory systems or services, or related components. In an example, "(@inventory exposed=true)" can be used to include a context within a schema (e.g., a node schema) where "exposed=true" is metadata understood by the inventory and/or other systems or services. Attributes can also include context within the models. For example, "(@inventory key=single primary-key=true)" could be annotated to an attribute model or attribute within a model. This example could allow nodes (or other elements having the attribute) to be found by searching on a single-valued primary key which corresponds to the annotated attribute.

After populating the model node corresponding to the data received, at 110 a determination is made as to whether the model node populated at 108 is the final node. If the determination at 110 returns negative, methodology 100 recycles to 104 where the aspects described above can be utilized to create additional schema-compliant model nodes in the model-driven graph structure.

If the determination at 110 returns positive, methodology 100 proceeds to 112 where edge schema definitions can be received. The edge schema definitions can define formatting, content, and rules related to edges in the model-driven graph such that the edges, showing connections and defining relationships between nodes, conform to one or more edge schemas. Complementarily (or alternatively, in embodiments where edge schemas do not fully define relationship rules) the model itself, containing the nodes and edges, also drives behavior by controlling valid relationships and instantiation of its elements. At 114, edge data is received. Edge data can (but need not in all embodiments necessarily) include relationship data related to two nodes connected by the edge in the model-driven graph structure. As with nodes above, 112 and 114 may be transposed, whereby edge data is received and an appropriate model is determined based on the edge data.

At 116, a model edge (e.g., instance of the edge schema) corresponding to the received edge data is populated. This includes logical arrangement in the model-driven graph structure with respect to other graph elements. Rules as to the type of data included and formatting of such data are applied to ensure the new or changed edge in the graph corresponds to the edge schema definition and any other model(s) (including, but not necessarily, a global or graph-wide model) of the model-driven graph.

After populating the edge node corresponding to the data received and proper schema, at 118 a determination is made as to whether the model edge populated at 116 is the final edge. If the determination at 118 returns negative, methodology 100 recycles to 112 where the aspects described above can be utilized to create additional model edges in the model-driven graph structure.

If the determination at 110 returns positive, methodology 100 proceeds to 120 and methodology 100 terminates.

Methodology 100 provides an example which shows a model node added before a model edge, but the order of aspects described and the quantities may vary. In alternative embodiments, nodes may be added without edges, edges may be added without nodes, one or more edges can be added before nodes, multiples of edges and/or nodes can be added concurrently or in varying orders, and so forth. For example, in an alternative embodiment 118 can recycle to 104. In embodiments, only model nodes are handled, and in alternative embodiments only model edges are added. Further, nodes or edges can be removed in addition to being added. Further, hybrid graphs which are partially model-driven can be created according to embodiments of methodology 100 or other aspects herein, whereby some, but not all, elements of a graph are model-driven and comply with schemas thereof.

As suggested, the model may drive what nodes and edges are added and what relationships may exist between them. The model itself can define or describe relationships and validity rules, and drive use of the schemas accordingly.

Thus, there can be different models having the same node and edge schemas because the rules, constraints, controls, et cetera, on a first model are different than those of a second model. Thus, while schemas may be kept the same, governance of the overall model may differ. In turn, models having similar or identical model rules can utilize different schemas without departing from the scope or spirit of the innovation.

FIG. 1B illustrates an example methodology 150 for changing schemas or model configuration within a model-driven graph structure. Methodology 150 and the associated model-driven graph structure allow for changes to one or more schemas or models of the model-driven graph structure to be propagated through the graph, maintaining consistency and allowing simple updating and configuration. In embodiments, this allows for on the fly changes to the model-driven graph which do not require re-creation or re-configuration that would impact other graph structures. Methodology 150 begins at 152 and proceeds to 154 where a change to a schema or model definition is provided. The change may be provided manually by an administrator other user, provided automatically based on element changes, provided automatically based on schema or graph changes, or based on other input or information.

At 156, the updated schema or model is propagated through the graph. In this fashion, elements subject to the model are located in the graph, and the element instance is updated to accord with the updated modifications to the schema or model. At 158, data stored in relation to the element instance is modified (e.g., added, deleted, changed) to comport with the updated schema or model format.

Once the element instance is compliant with the updated schema or model, methodology 150 proceeds to 160 where a determination is made as to whether other schema or model changes are to occur. If the determination at 160 returns positive, methodology 150 can recycle to 154 to complete additional changes. If the determination at 160 returns negative, methodology 150 proceeds to 162 and ends.

As with methodology 100, variants to methodology 150 will be appreciated in view of the disclosures herein. Further, methodologies 100 and 150 or aspects thereof can be interposed in operation such that instances of node schemas or edge schemas can be added (or removed) while the same or different schemas (or models) are updated. These changes can occur "on the fly" during use of the model-driven graph structure by, e.g., interpreting the schemas/models and changes from one version to another.

If a schema is changed with an update, the updated schema can be propagated through the model-driven graph structure and appropriate data from the previous instances utilizing the schema populated to the new schema. In an embodiment, a schema can be removed or deactivated within the model-driven graph structure, and no data populated to a new schema. The governance of the model can also be updated, after which rules or constraints promulgated by the model can be evaluated (e.g., check relationships between graph elements to confirm compliant with updates) and relationships or other model aspects modified to comply with the update.

Figure 2:
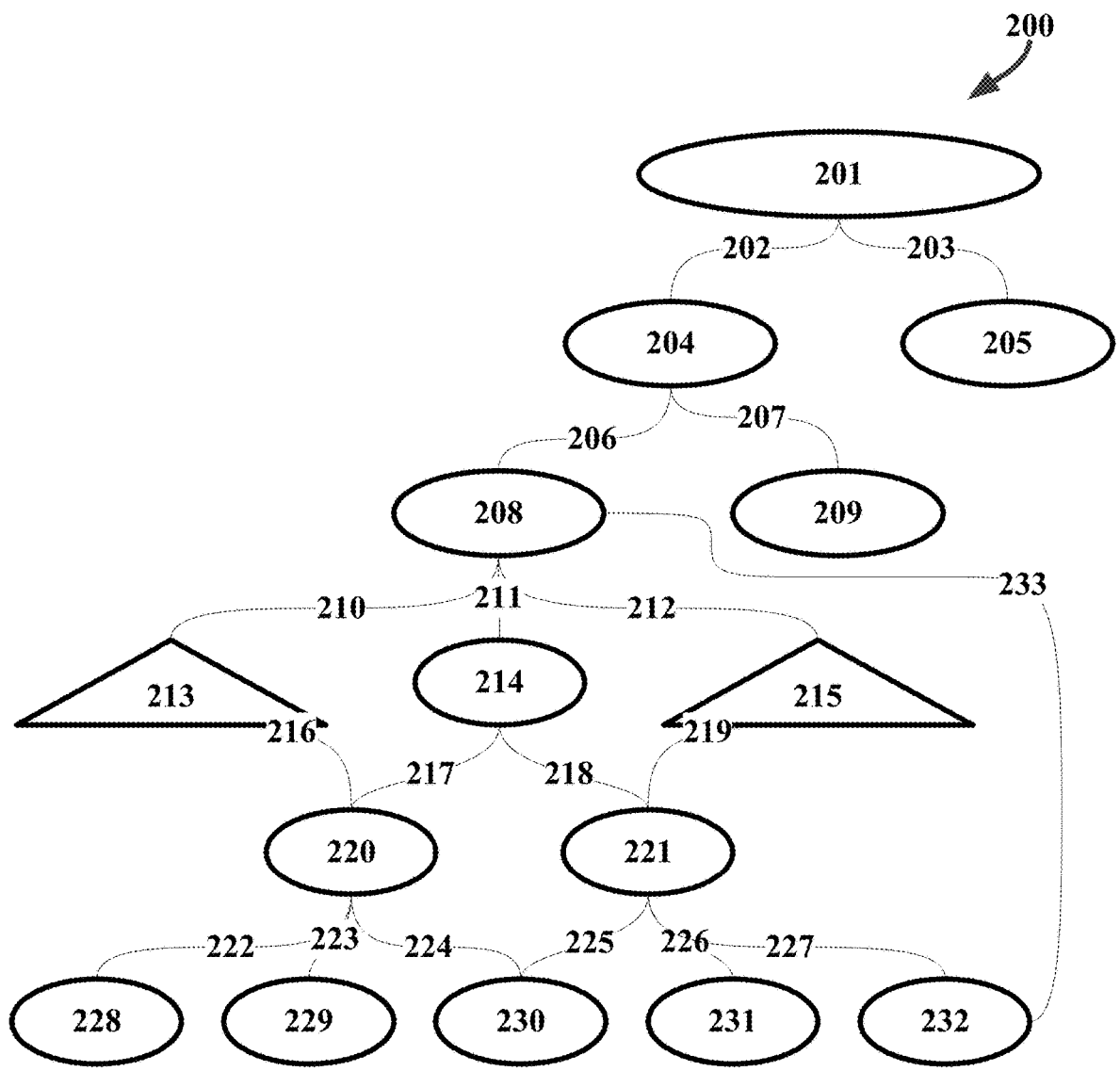
FIG. 2 illustrates an example representation of a model-driven graph structure.

Turning to FIG. 2, an example model-driven graph structure 200 is shown. Model-driven graph structure 200 includes model node instances 201, 204, 205, 208, 209, 213-215, 220, 221, and 228-232. These nodes can be instances according to schemas or sub-schemas of various physical or logical elements in model-driven graph structure 200. Model-driven graph structure 200 also includes model edge instances 202, 203, 206, 207, 210-212, 216-219, 222-227, and 233. Two or more such edges can share common schemas, or all edges may be described according to different schemas.

To provide an example of use of model-driven graph structure 200, node instance 201 can be a root node to the model-driven graph structure 200. Node instance 201 is a network resources node under which all network resources are described using schemas of model-driven graph structure 200.

Node instance 201 interacts with edge instances 202 and 203, which can be defined according to the same or different schemas identifying relationships with subsequent nodes. Node instances 204 and 205 can be, for example, different regions (geographic or logical) under which network resources are grouped. Accordingly, a schema for edge instances 202 and 203 can be a "has" schema because root node instance 201, network resources, has the region represented by node instance 204 and also has the region represented by node region 205. The relationship of this "possession" can be described according to metadata of the model for "has" model edges such as edge instance 202 and edge instance 203. Alternatively, model-driven graph structure 200 can define this valid relationship, rather than embedding it in an edge schema, while edge schemas would define the elements involved in the relationship but not the relationship itself.

Continuing, node instance 204, as a region, can connect through "has" model edge instances 206 and 207 to node instances 208 and 209, which can be resources owners (physical or logical entities) within the region.

Owner node instance 208 connects via a "has" model edge instance 211 to resource 214. Owner node instance 208 can also include "managed by" model edge instances 210 and 212 which connect to management node instances 213 and 215. In this regard, a different type of model node can model the fashion in which resources, which can be some or all of the resource instances belonging to (e.g., connected by a "has" edge) the owner node instance, are managed. In this example, management node instance 213 can be a "contracted" or "scheduled" management arrangement (e.g., resources assigned based on advance planning) and management node instance 215 can be a "flexible" or "on-demand" management arrangement (e.g., resources assigned at time of need based on order of requests or resource management algorithms).

Different edge schemas can then be used to describe the relationships between node instances 213-215 and node instances 220 and 221. Node instances 220 and 221 can be role node instances, describing roles, functions, or assignments related to both resources (e.g., resource node instances 214 and 228-232) and/or management node instances (e.g., management node instances 213 and 215). In this regard, edge instance 216 and 219 can be "composed of" edge schemas, describing management node instances 213 and 215 as having elements related thereto for purposes of carrying out their respective management schemes. Edge instances 217 and 218 can be "has role" edge schemas, describing resource node instance 214 as fulfilling the roles identified in role node instances 220 and 221. As described above, model-driven graph structure 200 may alternatively or complementarily also define such relationships at a hierarchical level above the edges, with edges defining elements affected by the relationships but not the relationships themselves. While edge schemas or instances herein are described as defining the relationships, this alternative or complementary format remains true throughout, and may be hybridized (some relationships defined by edges and some relationships defined by overall model) where more than one relationship is included within a model-driven graph.

Edge instances 222-227 can be "has task" edges, with the particular resource node instances 228-232 having tasks that depend on their respective management and role relationships. Resources node instances 228-232 can include two or more same or different resources represented by two or more same or different node schemas. As shown with, e.g., resources node instance 230 having "has task" edges 224 and 225 to role node instances 220 and 221 (which are respectively related to different management node instances 213 and 215), nodes may be tasked according to one or more roles and/or managed according to one or more management schemes.

Edge instance 233 can be a "has resource" edge which provides the owner, represented by owner node instance 208, direct control over that particular resource, represented by resource node instance 232. A "has resource" edge schema (or other schemas) can have different data and arrangements to enable or constrain particular relationships between nodes having their own schemas.

Model-driven graph structure 200 can be described differently based on the management node instance leveraged. For example, an actual model utilizing model-driven graph structure may use a particular management arrangement, and assume a different form based on the exclusive use of the selected management arrangement (e.g., either 213 or 215). The model or schema can be referenced in the particular instance at one of management node 213 or management node 215 depending on which of the arrangements is implemented in the particular instance.

Continuing in this regard, an instance query of a model instance using only the management arrangement represented by management node instance 213 would return role node instance 220, management node instance 213, and resource node instances 228-230, along with their respective relationship-defining edges. If resource node instance 228-230 relate to additional nodes (e.g., task assignment), this can also be returned.

Alternatively, an instance query of a model instance using only the management arrangement represented by management node instance 215 would return role node instance 221, management node instance 215, and resource node instances 230-232, along with their respective relationship-defining edges. If resource node instance 230-232 relate to additional nodes (e.g., task assignment), this can also be returned.

By leveraging a model-driven graphs using model-driven graph structure 200 or similar aspects, queries to the graph can be returned with a high confidence regarding accuracy and consistency. Like elements will be arranged according to like schemas, and the overall graph will be predictably and regularly structured.

Model-driven graph structure 200 thus provides an example of a model-driven graph having two or more node schemas and two or more edge schemas. Nodes and edges can be added or deleted easily and inter-operably by leveraging schemas for such, and changes to the schemas or model can be committed on the fly for simplicity and consistency. All or some instances within embodiments of model-driven graph structure 200 can be defined by a schema of that instance or class of instances. As is readily understood, model-driven graph structure may include an unlimited number of alternatives in terms of the quantity, type, and/or arrangement of nodes and edges. The node and edge types described are provided for explanatory purposes only, and not to be deemed non-limiting in view of the alternative, more complex, or simpler nodes and relationships therebetween described according to edges. Further, while model-driven graph structure 200 is generally directed toward network inventory, other applications within the scope of the disclosure will be appreciated by those of skill in the art.

Figure 3A:
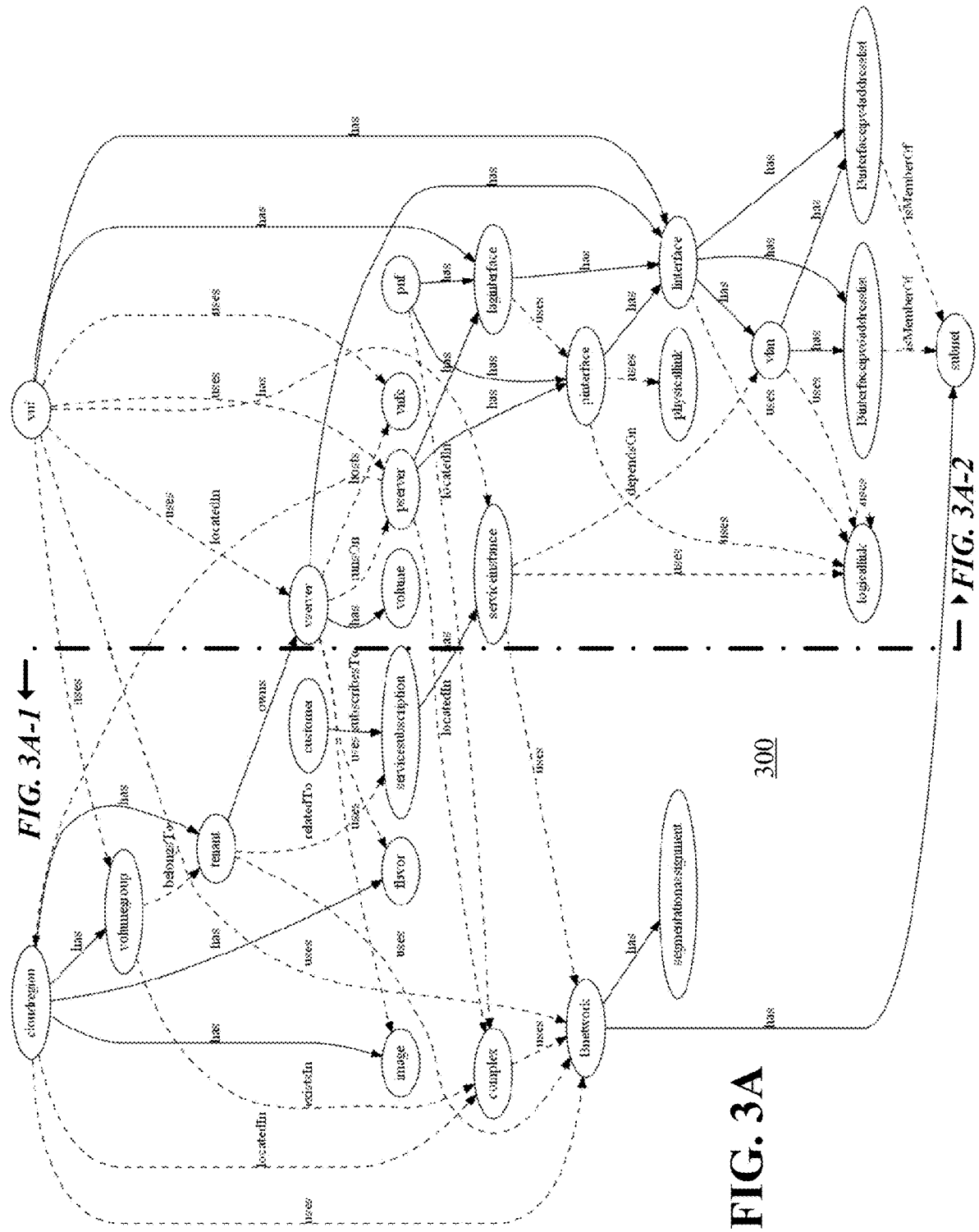
FIG. 3A and its portions shown enlarged in FIGS. 3A-1 and 3A-2 illustrate an example representation of a model-driven graph structure.
Figures 1, 3A:
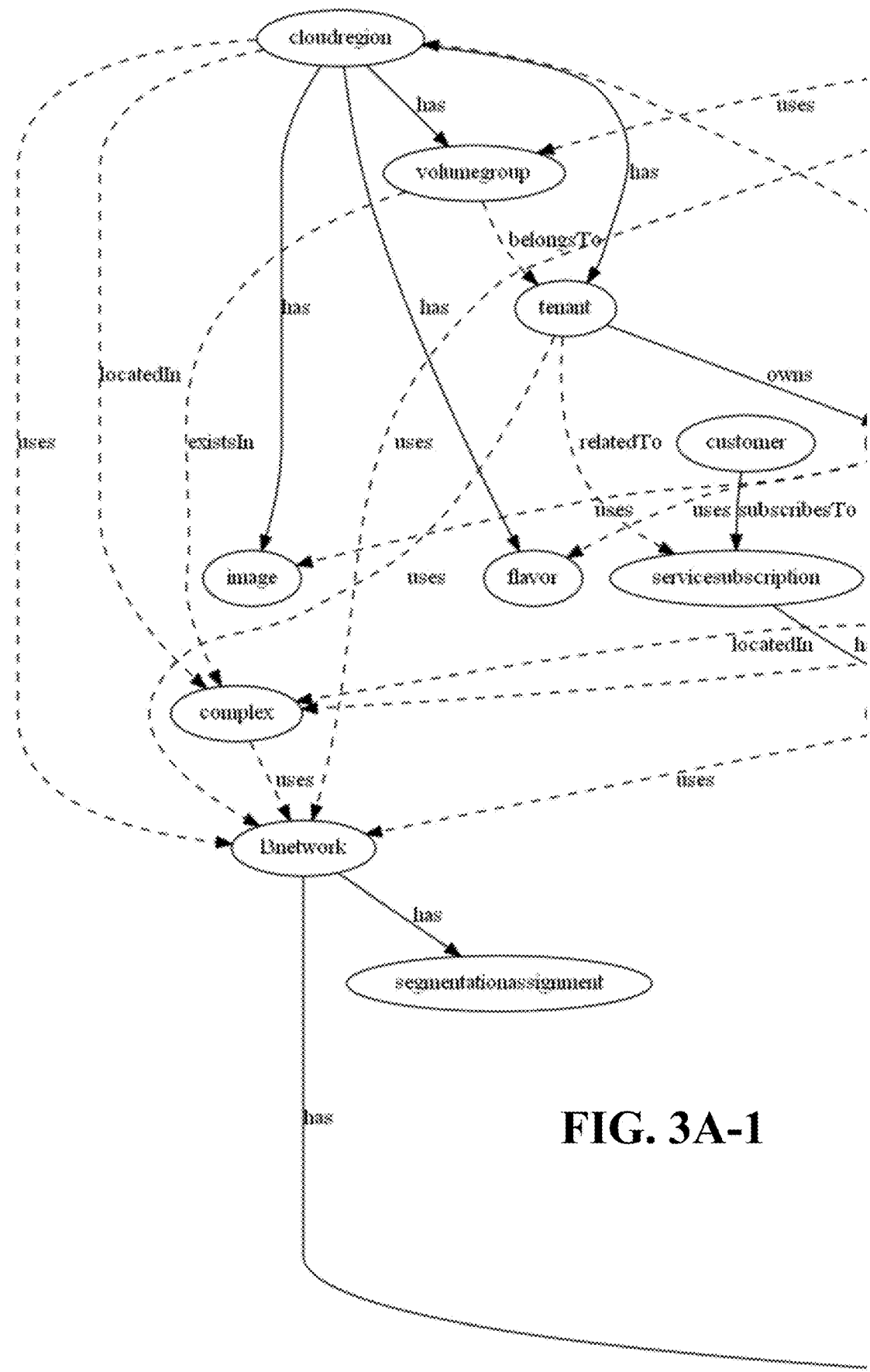
Figures 2, 3A:
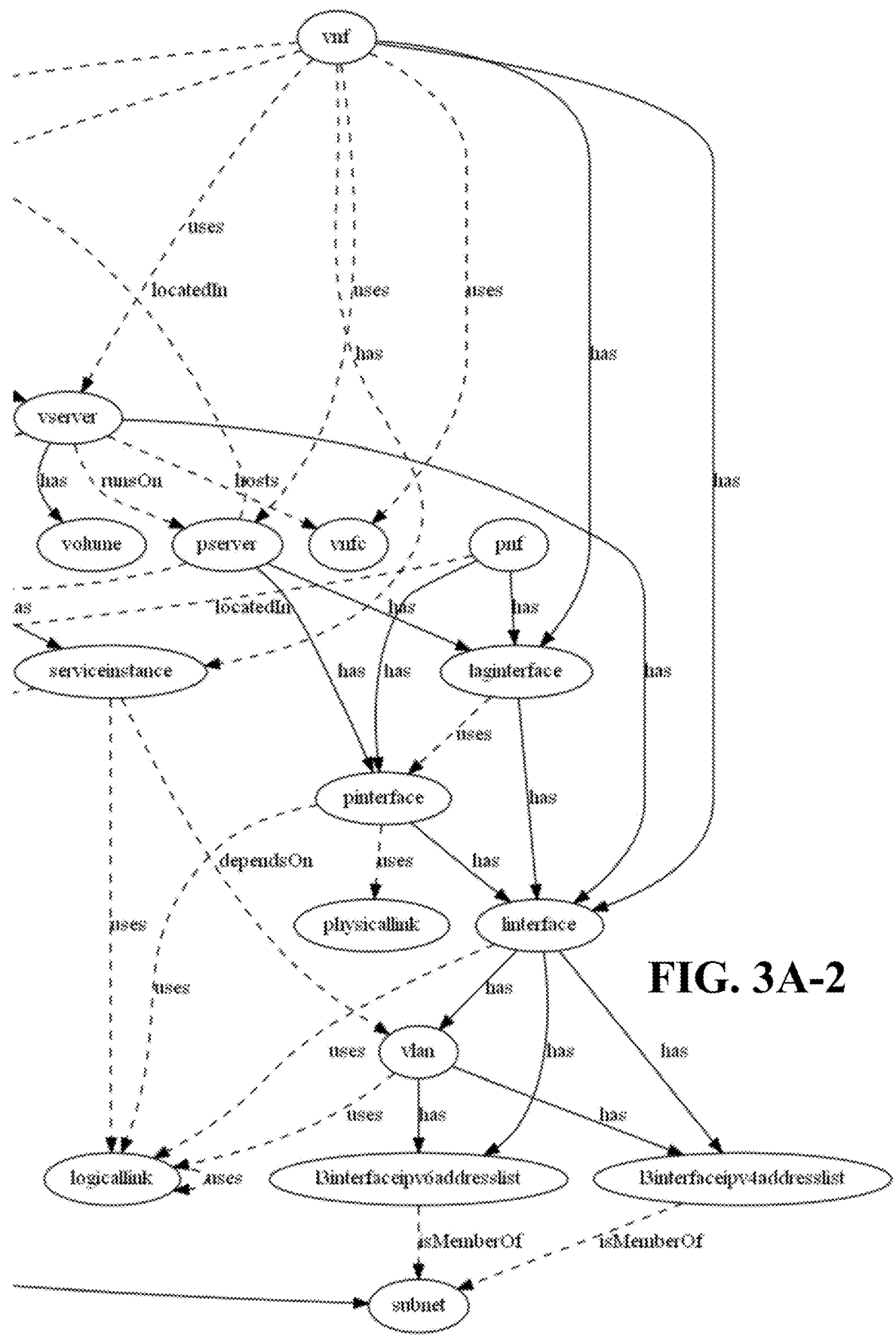
Figure 3B:
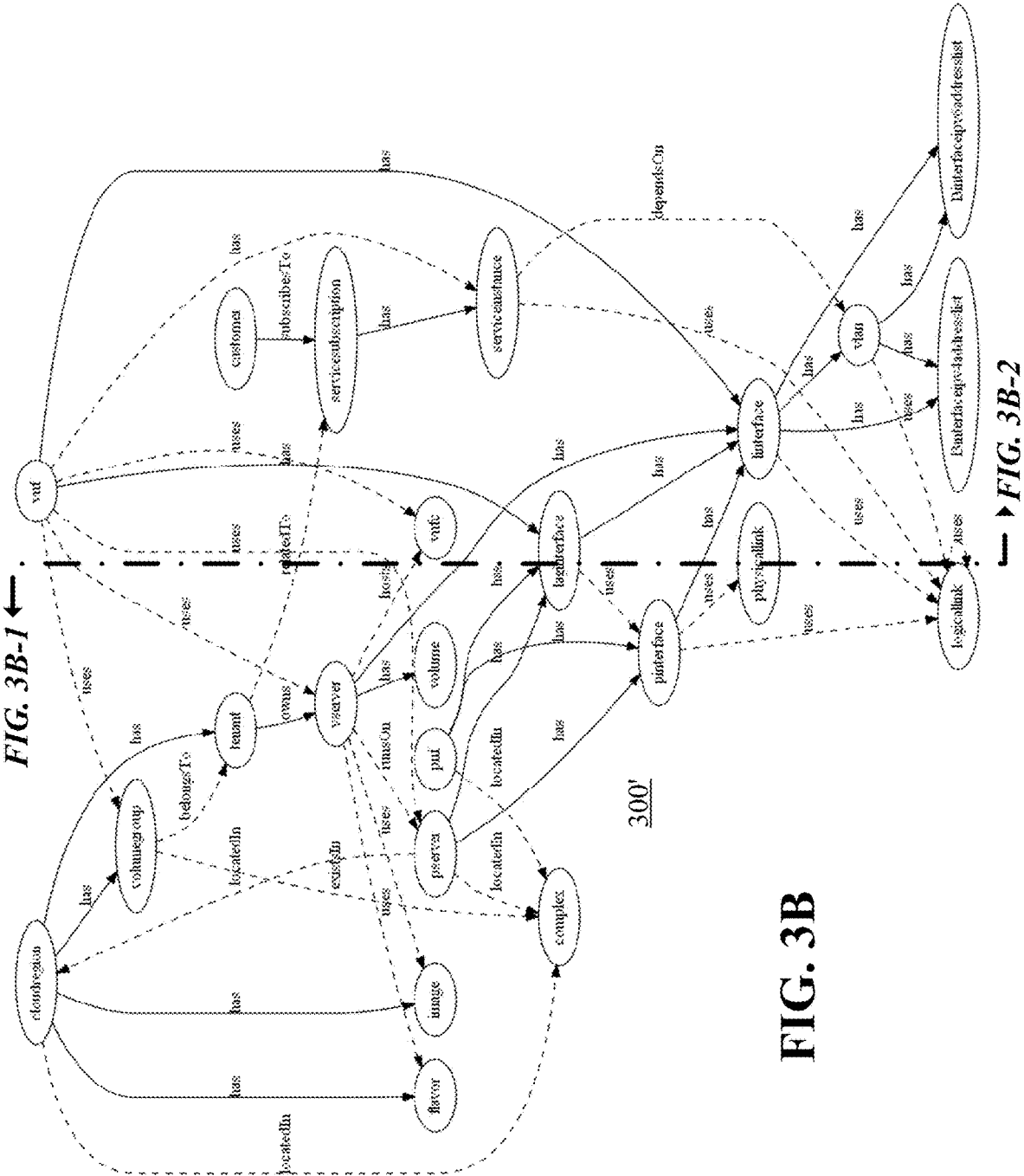
FIG. 3B and its portions shown enlarged in FIGS. 3B-1 and 3B-2, illustrates an example representation of a model-driven graph structure.
Figures 1, 3B:
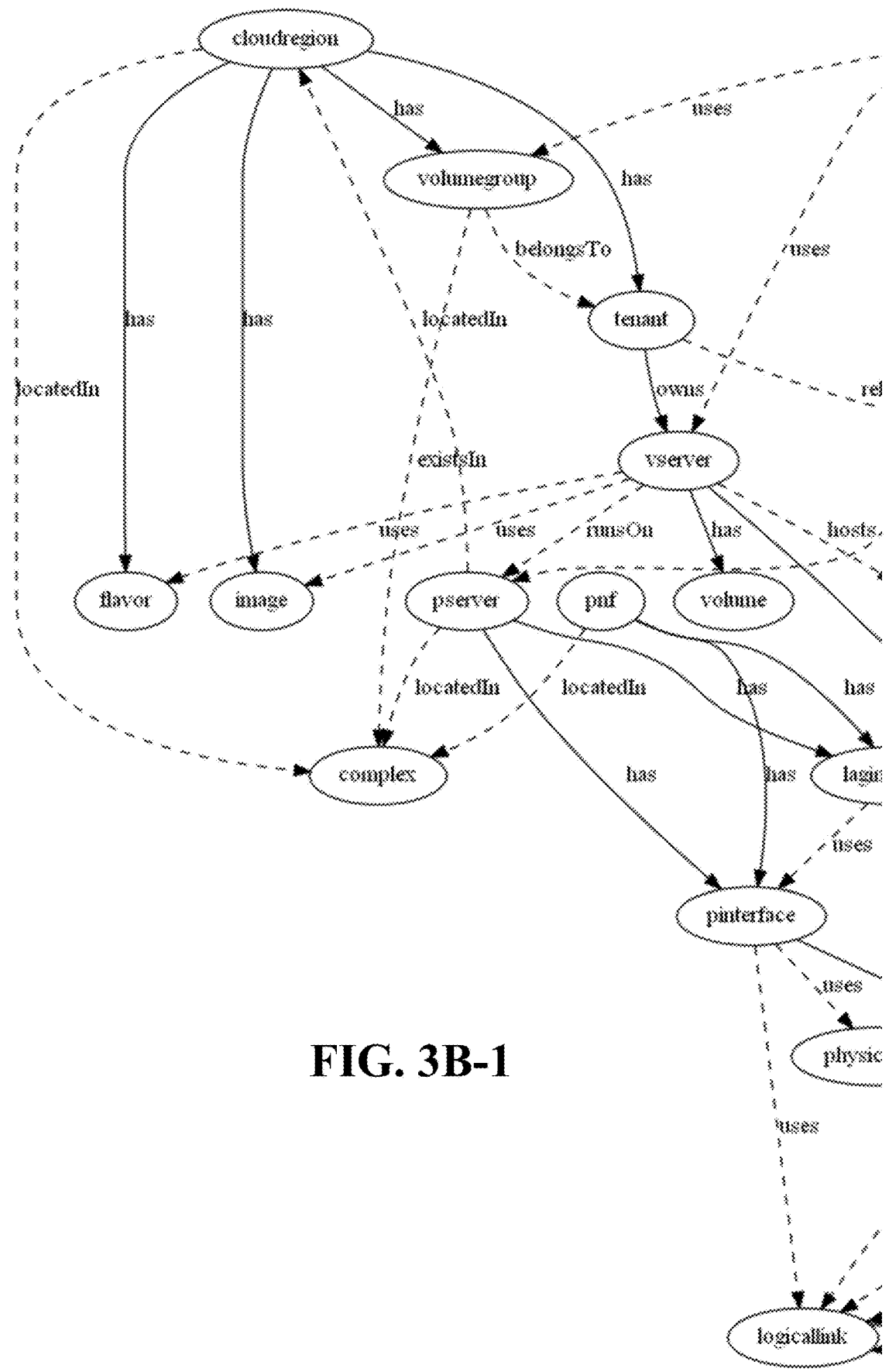
Figures 2, 3B:
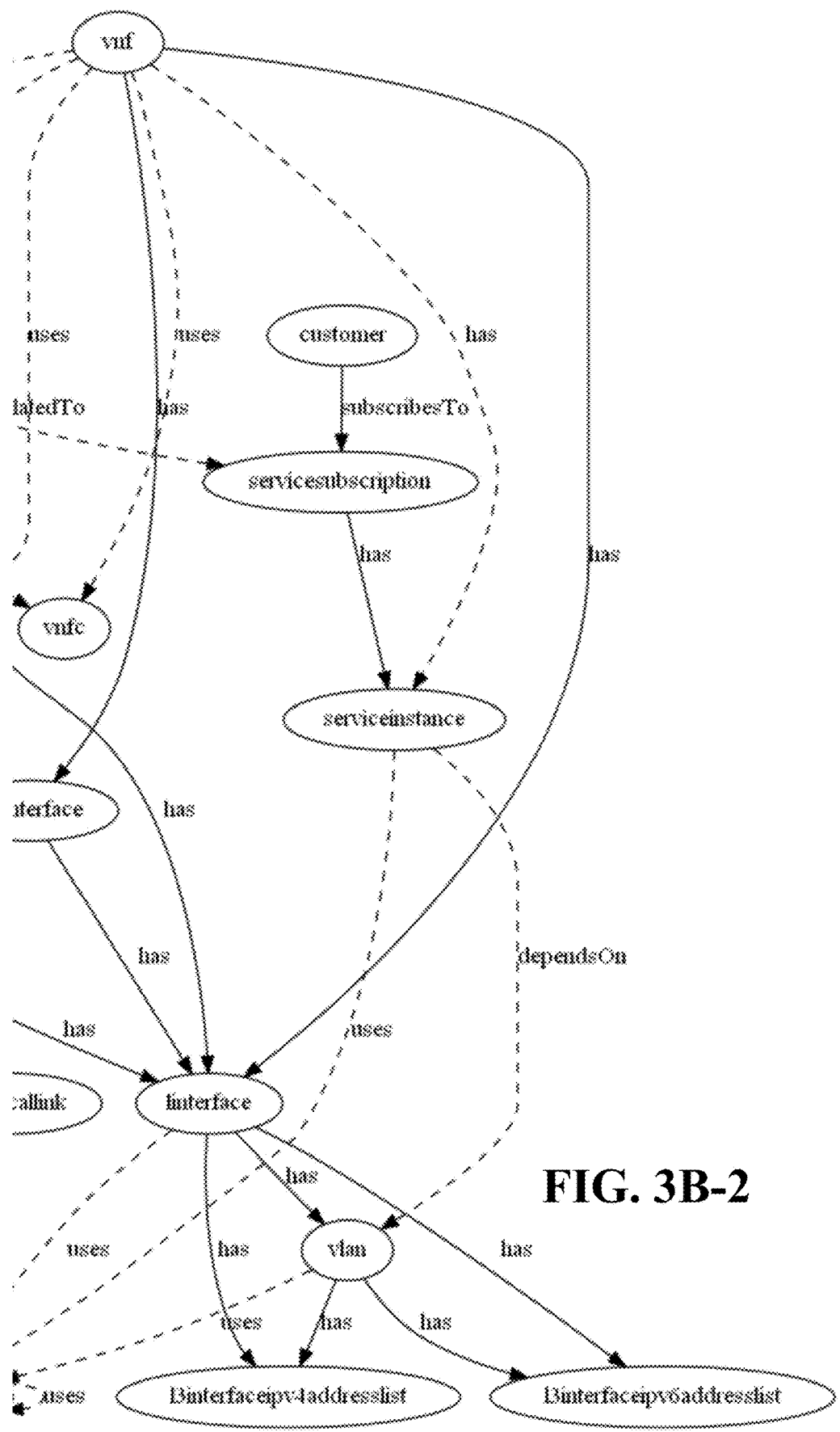
Figure 3C:
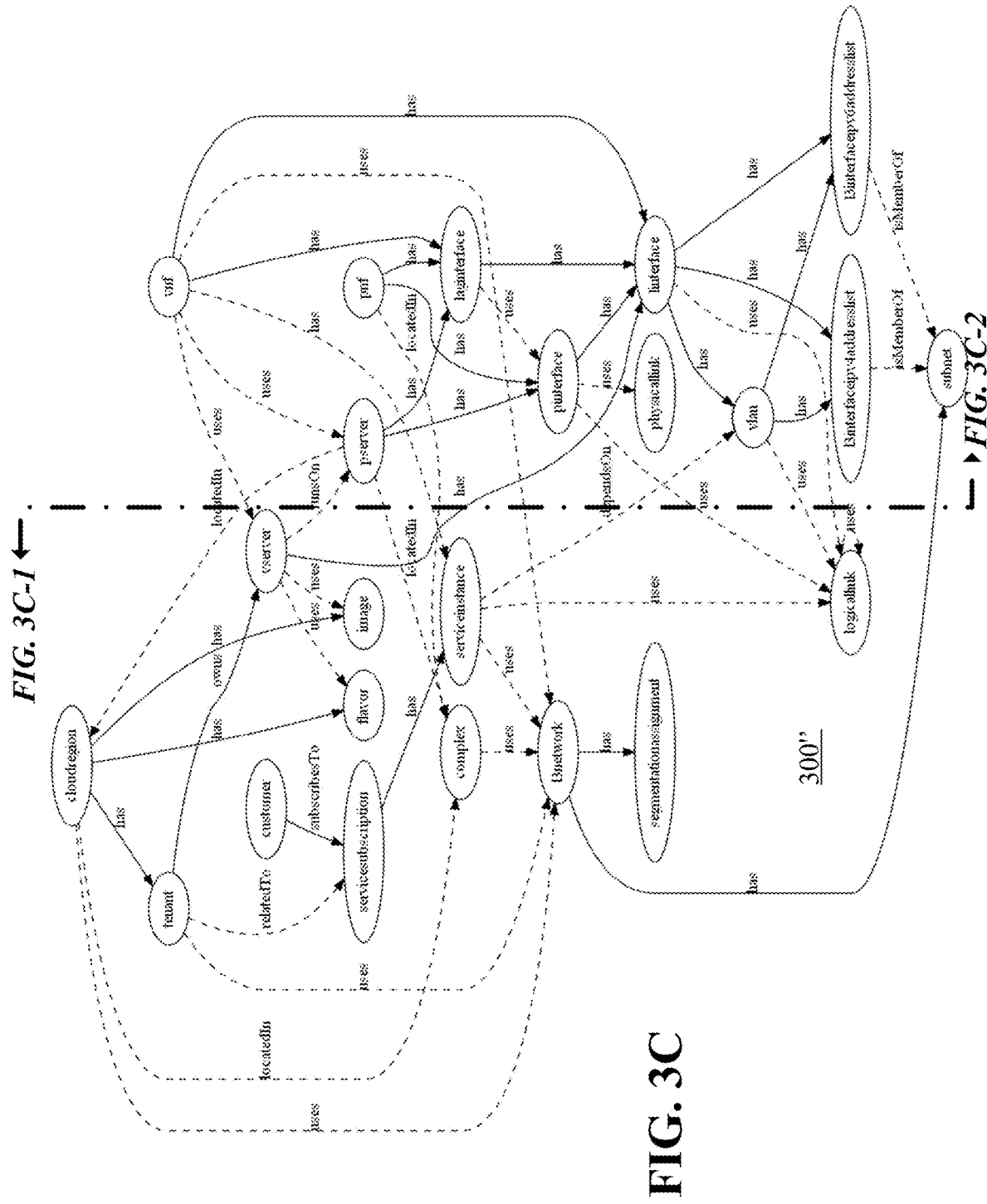
FIG. 3C and its portions shown enlarged in FIGS. 3C-1 and FIGS. 3C-2 illustrate an example representation of a model-driven graph structure.
Figures 1, 3C:
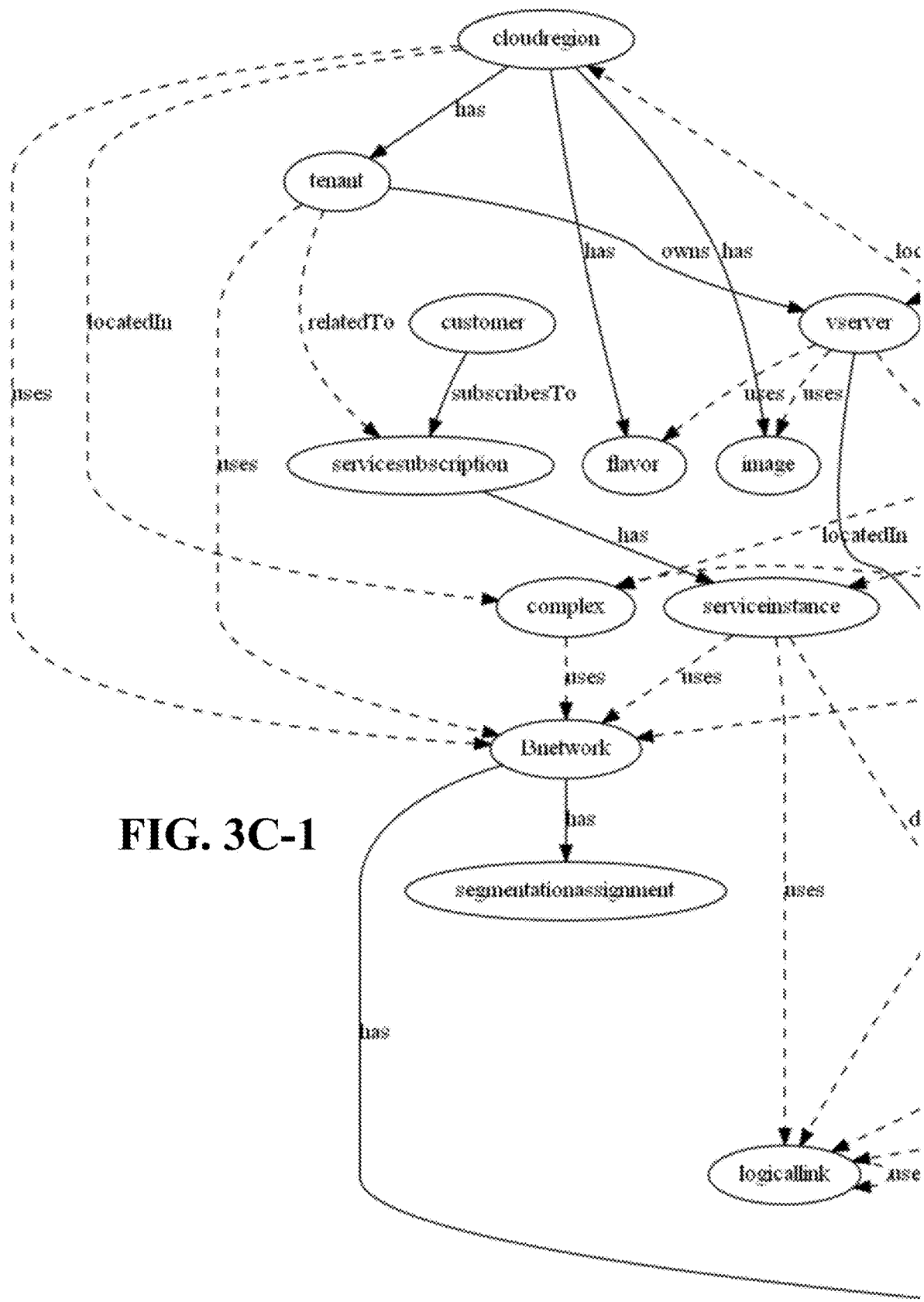
Figures 2, 3C:
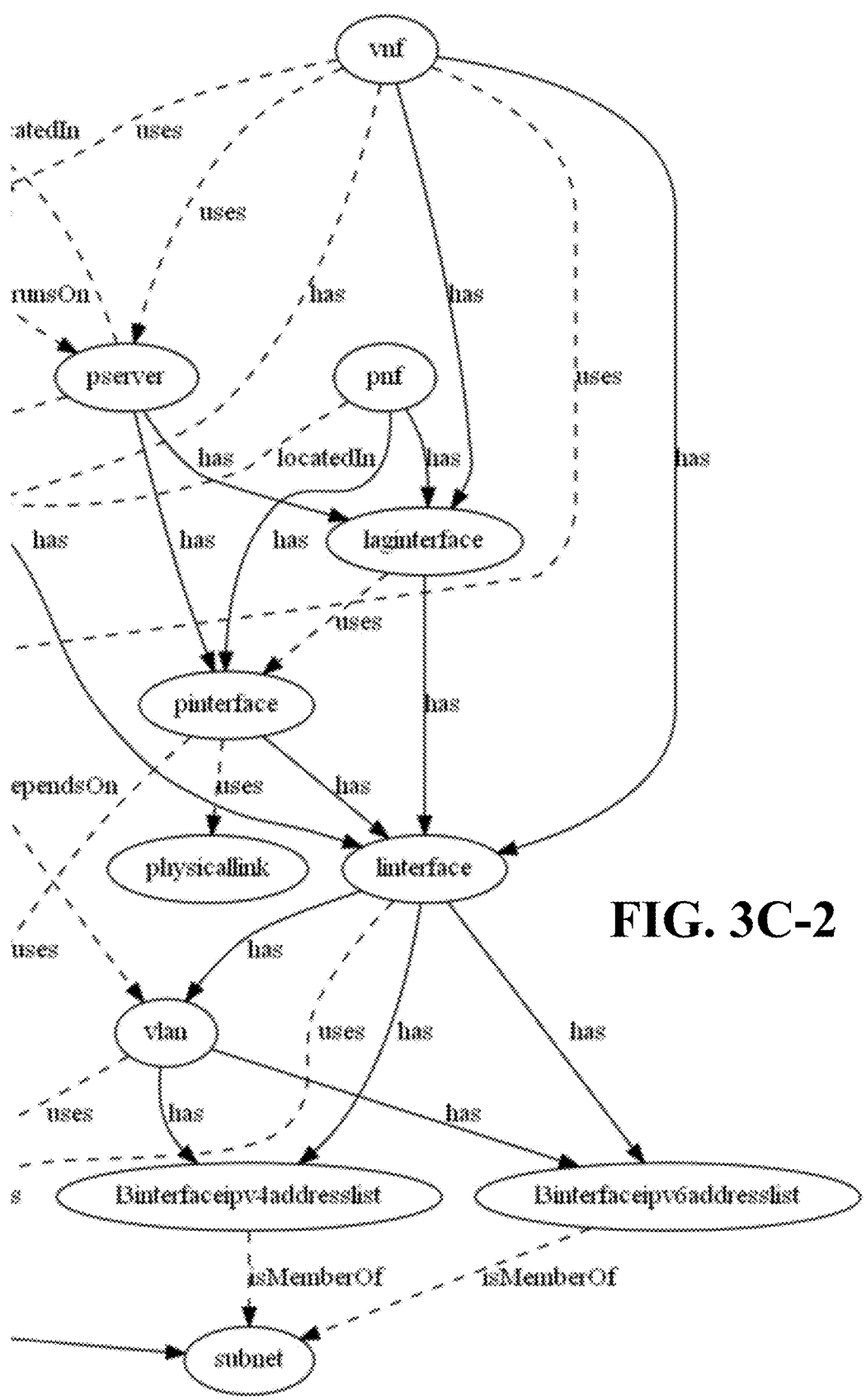

FIGS. 3A, 3B, and 3C illustrate alternative examples of model-driven graph structure 300, 300', and 300". These graphs are shown in greater detail in FIGS. 3A-1, 3A-2, 3B-1, 3B-2, 3C-1, and 3C-2 in which portions of FIGS. 3A, 3B, and 3C are enlarged. Where FIGS. 3A, 3B, and/or 3C are referenced, it is understood that their enlarged portions in FIGS. 3A-1 and 3A-2 (which when combined identically match FIG. 3A), FIGS. 3B-1 and 3B-2 (which when combined identically match FIG. 3B), and FIGS. 3C-1 and 3C-2 (which when combined identically match FIG. 3C) are also referenced.

As model-driven graph structure 300/300'/300" is by no means an exhaustive description of possible model-driven graph structures enabled by the disclosures herein, it is not discussed in intensive detail, but rather provided to illustrate an alternative to the details of FIG. 2. Model-driven graph structure 300/300'/300" also relates to a network inventory arrangement. Model nodes in model-driven graph structure 300/300'/300" relate to locations, services, groups, physical and logical resources, addresses, users, capabilities, et cetera, with node names reflecting this such as availability zones, groups, services, physical and logical resources, permissions, profiles, addresses, capabilities, users, et cetera. Model edges in model-driven graph structure, or alternatively the graph structure itself, describe(s) relationships such as nodes possessing or controlling other nodes, nodes belonging to groups, nodes utilizing particular networks or links, nodes existing in particular physical or logical positions, et cetera. In embodiments, model-driven graphs can be used with an Active and Available Inventory (A&AI) framework. In an embodiment, schemas and the model(s) can be compliant with an A&AI REST API or other APIs for related services, resources, networks, et cetera.

Model-driven graph 300/300'/300" is only intended as another example to illustrate example aspects alternative to others described herein and further elaborate on the scope and spirit of the innovation, and should not be interpreted to limit the aspects described herein in any manner.

Another example of a model-driven graph in view of the methods and systems described above can be described as follows to further illustrate the improvements captured in the disclosure. In a non-model-driven graph, new additions to the graph can be auto-discovered or added with some degree of automation. This could involve, for example, manual or automated devices interacting with interfaces operating in systems run on server computers managing the graph. A graph server or group of graph servers can be provided for management of the graph structure. However, the graph server and associated graph may be passive and accept data related to new elements or relationships within the graph as provided, rather than according to schemas and model structure utilizing the schemas. Depending on the manufacturer or vendor, seller or installer, or purchaser or client, different information subject to different standards may be provided. Thus, when a node or edge is added, it may not be compatible with all other nodes or edges, or may not match the formatting of nodes or edges having similar or even identical characteristics.

In a model-driven graph such as graph 300/300'/300", a graph server (or group of graph servers) administering the graph can provide schemas for nodes, edges, and classes thereof. The graph server(s) can be dedicated or shared among other network resources. The graph server(s) send and receive information related to graph nodes and edges. When a new graph node or edge is added—a router or cable connection, for example—the schema must be compliantly populated before the node is created in the model-driven graph structure. Further, if a node or edge is modified or deleted, the integrity of the overall graph with respect to schema and model compliance is still enforced (e.g., by the graph server(s) running graph management processes).

Model-driven graph 300/300'/300" includes a variety of node schemas and edge schemas which can be understood in terms of the elements represented by those of skill in the art. Node schemas referenced include, but are not limited to, Availability zone, Complex, Ctag Pool, L3 network, Network policy, VPN binding, Ctag assignment, vNF, vPE, vCE, Vpls-pe, Port group, Service instance, Cvlan tag, Connector, Virtual data center, Logical link, VF module, Network profile, License key resource, VNF image, Volume group, Tenant, Vserver, Volume, vNFC, IP address, Cloud region, DVS switch, OAM network, Service capability, Flavor, Image, Metadata, Logical Interface, Vlan, IP address list, SRIOV-vf, Subnet, Multicast configuration, IP sec configuration, Site pair set, Routing instance, Site pair, Customer, Class of service, Service subscription, Physical server, LAG interface, Physical interface, Model, Physical link, and Metadatum Edge schemas reference include, but are not limited to, has, locatedIn, existsIn, uses, relatedTo, runsOn, hosts, dependsOn, isMemberOf. These are just example schema reference types of elements or relationships therebetween within the graph, and others are readily embraced under this structure without departing from the scope or spirit of the innovation.

Model-driven graphs may be used in a variety of environments and with a variety of devices. For example, a network device can be a resource, contain resources, manage resources, define relationships, et cetera, related to graph elements. Further, various wired and wireless networks can be used with model-driven graph structures, or with or by elements of the model-driven graph structures.

Figure 4:
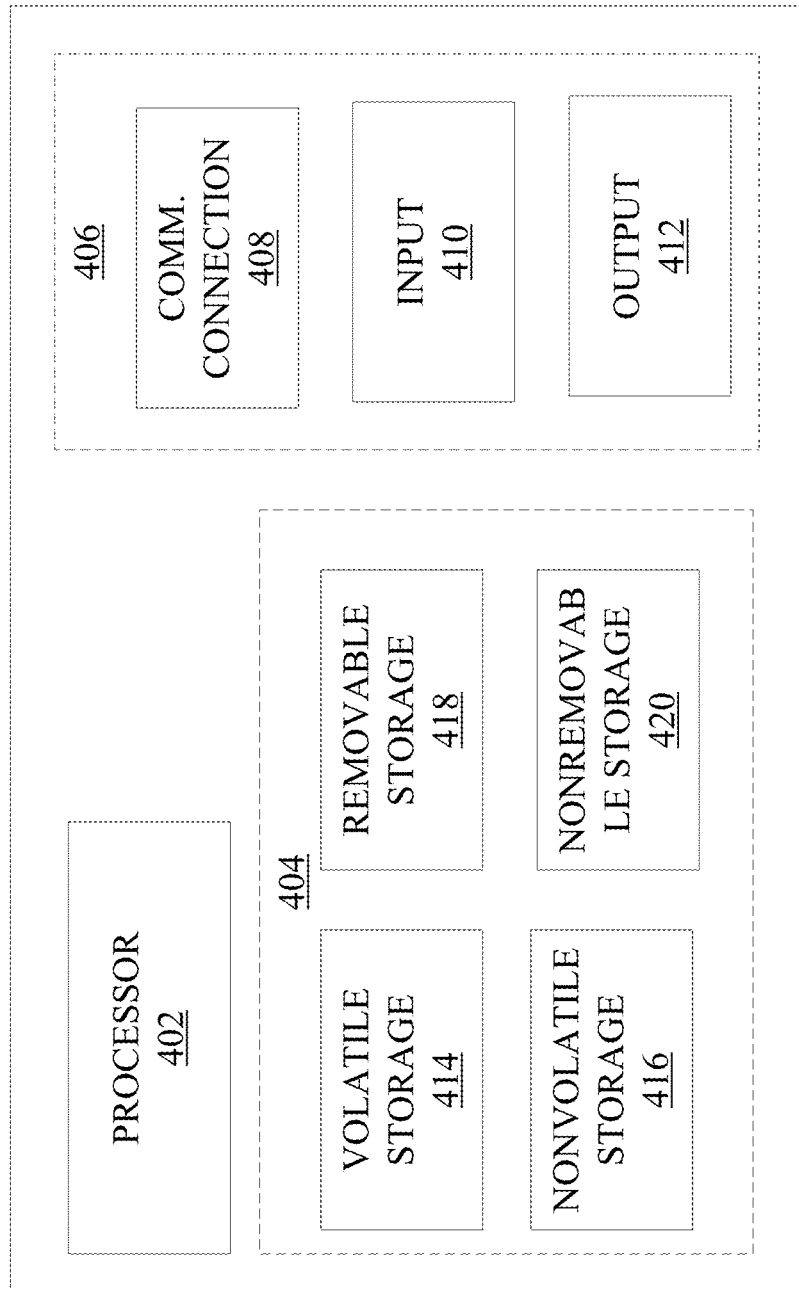
FIG. 4 is a schematic of an exemplary network device.

In this regard, FIG. 4 is a block diagram of network device 400 that may be connected to or comprise a component of cellular network, wireless network, or other network. Network device 400 may comprise hardware or a combination of hardware and software. The functionality to facilitate telecommunications via a telecommunications network may reside in one or combination of network devices 400. Network device 400 depicted in FIG. 4 may represent or perform functionality of an appropriate network device 400, or combination of network devices 400, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 400 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 400 may comprise a processor 402 and a memory 404 coupled to processor 402. Memory 404 may contain executable instructions that, when executed by processor 402, cause processor 402 to effectuate operations associated with mapping wireless signal strength. As evident from the description herein, network device 400 is not to be construed as software per se.

In addition to processor 402 and memory 404, network device 400 may include an input/output system 406. Processor 402, memory 404, and input/output system 406 may be coupled together (coupling not shown in FIG. 4) to allow communications therebetween. Each portion of network device 400 may comprise circuitry for performing functions associated with each respective portion. Thus, each portion may comprise hardware, or a combination of hardware and software. Accordingly, each portion of network device 400 is not to be construed as software per se. Input/output system 406 may be capable of receiving or providing information from or to a communications device or other network entities configured for telecommunications. For example input/output system 406 may include a wireless communications (e.g., 3G/4G/GPS) card. Input/output system 406 may be capable of receiving or sending video information, audio information, control information, image information, data, or any combination thereof. Input/output system 406 may be capable of transferring information with network device 400. In various configurations, input/output system 406 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 406 may comprise a Wi-Fi finder, a two-way GPS chipset or equivalent, or the like, or a combination thereof.

Input/output system 406 of network device 400 also may contain a communication connection 408 that allows network device 400 to communicate with other devices, network entities, or the like. Communication connection 408 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 406 also may include an input device 410 such as keyboard, mouse, pen, voice input device, or touch input device. Input/output system 406 may also include an output device 412, such as a display, speakers, or a printer.

Processor 402 may be capable of performing functions associated with telecommunications, such as functions for processing broadcast messages, as described herein. For example, processor 402 may be capable of, in conjunction with any other portion of network device 400, determining a type of broadcast message and acting according to the broadcast message type or content, as described herein.

Memory 404 of network device 400 may comprise a storage medium having a concrete, tangible, physical structure. As is known, a signal does not have a concrete, tangible, physical structure. Memory 404, as well as any computer-readable storage medium described herein, is not to be construed as a signal. Memory 404, as well as any computer-readable storage medium described herein, is not to be construed as a transient signal. Memory 404, as well as any computer-readable storage medium described herein, is not to be construed as a propagating signal. Memory 404, as well as any computer-readable storage medium described herein, is to be construed as an article of manufacture.

Memory 404 may store any information utilized in conjunction with telecommunications. Depending upon the exact configuration or type of processor, memory 404 may include a volatile storage 414 (such as some types of RAM), a nonvolatile storage 416 (such as ROM, flash memory), or a combination thereof. Memory 404 may include additional storage (e.g., a removable storage 418 or a nonremovable storage 420) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 400. Memory 404 may comprise executable instructions that, when executed by processor 402, cause processor 402 to effectuate operations to map signal strengths in an area of interest.

Figure 5:
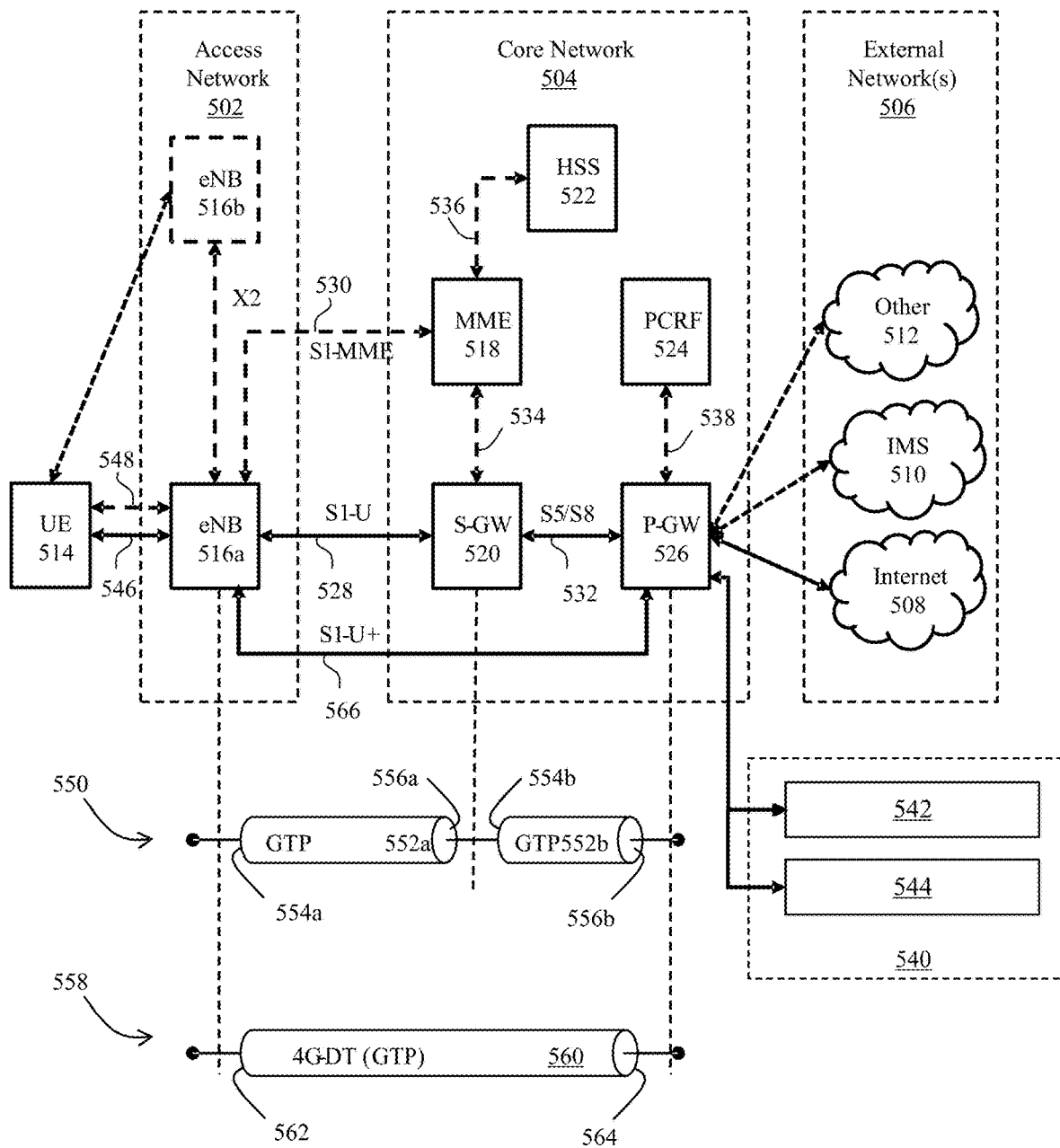
FIG. 5 depicts an exemplary communication system that provide wireless telecommunication services over wireless communication networks.

FIG. 5 illustrates a functional block diagram depicting one example of an LTE-EPS network architecture 500 related to the current disclosure. In particular, the network architecture 500 disclosed herein is referred to as a modified LTE-EPS architecture 500 to distinguish it from a traditional LTE-EPS architecture. While these aspects are provided for example purposes, modified LTE-EPS architecture and traditional LTE-EPS architectures can conform to different models both of which may be reflected in the same model-driven graph.

An example modified LTE-EPS architecture 500 is based at least in part on standards developed by the 3rd Generation Partnership Project (3GPP), with information available at www.3gpp.org. In one embodiment, the LTE-EPS network architecture 500 includes an access network 502, a core network 504, e.g., an EPC or Common BackBone (CBB) and one or more external networks 506, sometimes referred to as PDN or peer entities. Different external networks 506 can be distinguished from each other by a respective network identifier, e.g., a label according to DNS naming conventions describing an access point to the PDN. Such labels can be referred to as Access Point Names (APN). External networks 506 can include one or more trusted and non-trusted external networks such as an internet protocol (IP) network 508, an IP multimedia subsystem (IMS) network 510, and other networks 512, such as a service network, a corporate network, or the like.

Access network 502 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 502 can include one or more communication devices, commonly referred to as UE 514, and one or more wireless access nodes, or base stations 516a, 516b. During network operations, at least one base station 516 communicates directly with UE 514. Base station 516 can be an evolved Node B (e-NodeB), with which UE 514 communicates over the air and wirelessly. UEs 514 can include, without limitation, wireless devices, e.g., satellite communication systems, portable digital assistants (PDAs), laptop computers, tablet devices and other mobile devices (e.g., cellular telephones, smart appliances, and so on). UEs 514 can connect to eNBs 516 when UE 514 is within range according to a corresponding wireless communication technology.

UE 514 generally runs one or more applications that engage in a transfer of packets between UE 514 and one or more external networks 506. Such packet transfers can include one of downlink packet transfers from external network 506 to UE 514, uplink packet transfers from UE 514 to external network 506 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 504, e.g., according to parameters, such as the QoS.

Core network 504 uses a concept of bearers, e.g., EPS bearers, to route packets, e.g., IP traffic, between a particular gateway in core network 504 and UE 514. A bearer refers generally to an IP packet flow with a defined QoS between the particular gateway and UE 514. Access network 502, e.g., E UTRAN, and core network 504 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 504 includes various network entities, such as MME 518, SGW 520, Home Subscriber Server (HSS) 522, Policy and Charging Rules Function (PCRF) 524 and PGW 526. In one embodiment, MME 518 comprises a control node performing a control signaling between various equipment and devices in access network 502 and core network 504. The protocols running between UE 514 and core network 504 are generally known as Non-Access Stratum (NAS) protocols.

For illustration purposes only, the terms MME 518, SGW 520, HSS 522 and PGW 526, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 520 routes and forwards all user data packets. SGW 520 also acts as a mobility anchor for user plane operation during handovers between base stations, e.g., during a handover from first eNB 516a to second eNB 516b as may be the result of UE 514 moving from one area of coverage, e.g., cell, to another. SGW 520 can also terminate a downlink data path, e.g., from external network 506 to UE 514 in an idle state, and trigger a paging operation when downlink data arrives for UE 514. SGW 520 can also be configured to manage and store a context for UE 514, e.g., including one or more of parameters of the IP bearer service and network internal routing information. In addition, SGW 520 can perform administrative functions, e.g., in a visited network, such as collecting information for charging (e.g., the volume of data sent to or received from the user), and/or replicate user traffic, e.g., to support a lawful interception. SGW 520 also serves as the mobility anchor for interworking with other 3GPP technologies such as universal mobile telecommunication system (UMTS).

At any given time, UE 514 is generally in one of three different states: detached, idle, or active. The detached state is typically a transitory state in which UE 514 is powered on but is engaged in a process of searching and registering with network 502. In the active state, UE 514 is registered with access network 502 and has established a wireless connection, e.g., radio resource control (RRC) connection, with eNB 516. Whether UE 514 is in an active state can depend on the state of a packet data session, and whether there is an active packet data session. In the idle state, UE 514 is generally in a power conservation state in which UE 514 typically does not communicate packets. When UE 514 is idle, SGW 520 can terminate a downlink data path, e.g., from one peer entity 506, and triggers paging of UE 514 when data arrives for UE 514. If UE 514 responds to the page, SGW 520 can forward the IP packet to eNB 516a.

HSS 522 can manage subscription-related information for a user of UE 514. For example, tHSS 522 can store information such as authorization of the user, security requirements for the user, quality of service (QoS) requirements for the user, etc. HSS 522 can also hold information about external networks 506 to which the user can connect, e.g., in the form of an APN of external networks 506. For example, MME 518 can communicate with HSS 522 to determine if UE 514 is authorized to establish a call, e.g., a voice over IP (VoIP) call before the call is established.

PCRF 524 can perform QoS management functions and policy control. PCRF 524 is responsible for policy control decision-making, as well as for controlling the flow-based charging functionalities in a policy control enforcement function (PCEF), which resides in PGW 526. PCRF 524 provides the QoS authorization, e.g., QoS class identifier and bit rates that decide how a certain data flow will be treated in the PCEF and ensures that this is in accordance with the user's subscription profile.

PGW 526 can provide connectivity between the UE 514 and one or more of the external networks 506. In illustrative network architecture 500, PGW 526 can be responsible for IP address allocation for UE 514, as well as one or more of QoS enforcement and flow-based charging, e.g., according to rules from the PCRF 524. PGW 526 is also typically responsible for filtering downlink user IP packets into the different QoS-based bearers. In at least some embodiments, such filtering can be performed based on traffic flow templates. PGW 526 can also perform QoS enforcement, e.g., for guaranteed bit rate bearers. PGW 526 also serves as a mobility anchor for interworking with non-3GPP technologies such as CDMA2000.

Within access network 502 and core network 504 there may be various bearer paths/interfaces, e.g., represented by solid lines 528 and 530. Some of the bearer paths can be referred to by a specific label. For example, solid line 528 can be considered an S1-U bearer and solid line 532 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 504 can include various signaling bearer paths/interfaces, e.g., control plane paths/interfaces represented by dashed lines 530, 534, 536, and 538. Some of the signaling bearer paths may be referred to by a specific label. For example, dashed line 530 can be considered as an S1-MME signaling bearer, dashed line 534 can be considered as an S11 signaling bearer and dashed line 536 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 566. In the illustrative example, the S1-U+ user plane interface extends between the eNB 516a and PGW 526. Notably, S1-U+ path/interface does not include SGW 520, a node that is otherwise instrumental in configuring and/or managing packet forwarding between eNB 516a and one or more external networks 506 by way of PGW 526. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 520, 526 due to excessive handover events.

In some embodiments, PGW 526 is coupled to storage device 540, shown in phantom. Storage device 540 can be integral to one of the network nodes, such as PGW 526, for example, in the form of internal memory and/or disk drive. It is understood that storage device 540 can include registers suitable for storing address values. Alternatively or in addition, storage device 540 can be separate from PGW 526, for example, as an external hard drive, a flash drive, and/or network storage.

Storage device 540 selectively stores one or more values relevant to the forwarding of packet data. For example, storage device 540 can store identities and/or addresses of network entities, such as any of network nodes 518, 520, 522, 524, and 526, eNBs 516 and/or UE 514. In the illustrative example, storage device 540 includes a first storage location 542 and a second storage location 544. First storage location 542 can be dedicated to storing a Currently Used Downlink address value 542. Likewise, second storage location 544 can be dedicated to storing a Default Downlink Forwarding address value 544. PGW 526 can read and/or write values into either of storage locations 542, 544, for example, managing Currently Used Downlink Forwarding address value 542 and Default Downlink Forwarding address value 544 as disclosed herein.

In some embodiments, the Default Downlink Forwarding address for each EPS bearer is the SGW S5-U address for each EPS Bearer. The Currently Used Downlink Forwarding address" for each EPS bearer in PGW 526 can be set every time when PGW 526 receives an uplink packet, e.g., a GTP-U uplink packet, with a new source address for a corresponding EPS bearer. When UE 514 is in an idle state, the "Current Used Downlink Forwarding address" field for each EPS bearer of UE 514 can be set to a "null" or other suitable value.

In some embodiments, the Default Downlink Forwarding address is only updated when PGW 526 receives a new SGW S5-U address in a predetermined message or messages. For example, the Default Downlink Forwarding address is only updated when PGW 526 receives one of a Create Session Request, Modify Bearer Request and Create Bearer Response messages from SGW 520.

As values 542, 544 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 502 and core network 504 are illustrated in a simplified block diagram in FIG. 5. In other words, either or both of access network 502 and the core network 504 can include additional network elements that are not shown, such as various routers, switches and controllers. In addition, although FIG. 5 illustrates only a single one of each of the various network elements, it should be noted that access network 502 and core network 504 can include any number of the various network elements. For example, core network 504 can include a pool (i.e., more than one) of MMEs 518, SGWs 520 or PGWs 526.

In the illustrative example, data traversing a network path between UE 514, eNB 516a, SGW 520, PGW 526 and external network 506 may be considered to constitute data transferred according to an end-to-end IP service. However, for the present disclosure, to properly perform establishment management in LTE-EPS network architecture 500, the core network, data bearer portion of the end-to-end IP service is analyzed.

An establishment may be defined herein as a connection set up request between any two elements within LTE-EPS network architecture 500. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 546) between UE 514 and eNB 516a, a second portion (e.g., an S1 data bearer 528) between eNB 516a and SGW 520, and a third portion (e.g., an S5/S8 bearer 532) between SGW 520 and PGW 526. Various signaling bearer portions are also illustrated in FIG. 5. For example, a first signaling portion (e.g., a signaling radio bearer 548) between UE 514 and eNB 516a, and a second signaling portion (e.g., S1 signaling bearer 530) between eNB 516a and MME 518.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 500, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 550 includes a first tunnel 552a between two tunnel endpoints 554a and 556a, and a second tunnel 552b between two tunnel endpoints 554b and 556b. In the illustrative example, first tunnel 552a is established between eNB 516a and SGW 520. Accordingly, first tunnel 552a includes a first tunnel endpoint 554a corresponding to an S1-U address of eNB 516a (referred to herein as the eNB S1-U address), and second tunnel endpoint 556a corresponding to an S1-U address of SGW 520 (referred to herein as the SGW S1-U address). Likewise, second tunnel 552b includes first tunnel endpoint 554b corresponding to an S5-U address of SGW 520 (referred to herein as the SGW S5-U address), and second tunnel endpoint 556b corresponding to an S5-U address of PGW 526 (referred to herein as the PGW S5-U address).

In at least some embodiments, first tunnel solution 550 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 558 includes a single or direct tunnel 560 between tunnel endpoints 562 and 564. In the illustrative example, direct tunnel 560 is established between eNB 516a and PGW 526, without subjecting packet transfers to processing related to SGW 520. Accordingly, direct tunnel 560 includes first tunnel endpoint 562 corresponding to the eNB S1-U address, and second tunnel endpoint 564 corresponding to the PGW S5-U address. Packet data received at either end can be encapsulated into a payload and directed to the corresponding address of the other end of the tunnel. Such direct tunneling avoids processing, e.g., by SGW 520 that would otherwise relay packets between the same two endpoints, e.g., according to a protocol, such as the GTP-U protocol.

In some scenarios, direct tunneling solution 558 can forward user plane data packets between eNB 516a and PGW 526, by way of SGW 520. That is, SGW 520 can serve a relay function, by relaying packets between two tunnel endpoints 516a, 526. In other scenarios, direct tunneling solution 558 can forward user data packets between eNB 516a and PGW 526, by way of the S1 U+ interface, thereby bypassing SGW 520.

Generally, UE 514 can have one or more bearers at any one time. The number and types of bearers can depend on applications, default requirements, and so on. It is understood that the techniques disclosed herein, including the configuration, management and use of various tunnel solutions 550, 558, can be applied to the bearers on an individual bases. That is, if user data packets of one bearer, say a bearer associated with a VoIP service of UE 514, then the forwarding of all packets of that bearer are handled in a similar manner. Continuing with this example, the same UE 514 can have another bearer associated with it through the same eNB 516a. This other bearer, for example, can be associated with a relatively low rate data session forwarding user data packets through core network 504 simultaneously with the first bearer. Likewise, the user data packets of the other bearer are also handled in a similar manner, without necessarily following a forwarding path or solution of the first bearer. Thus, one of the bearers may be forwarded through direct tunnel 558; whereas, another one of the bearers may be forwarded through a two-tunnel solution 550.

Figure 6:
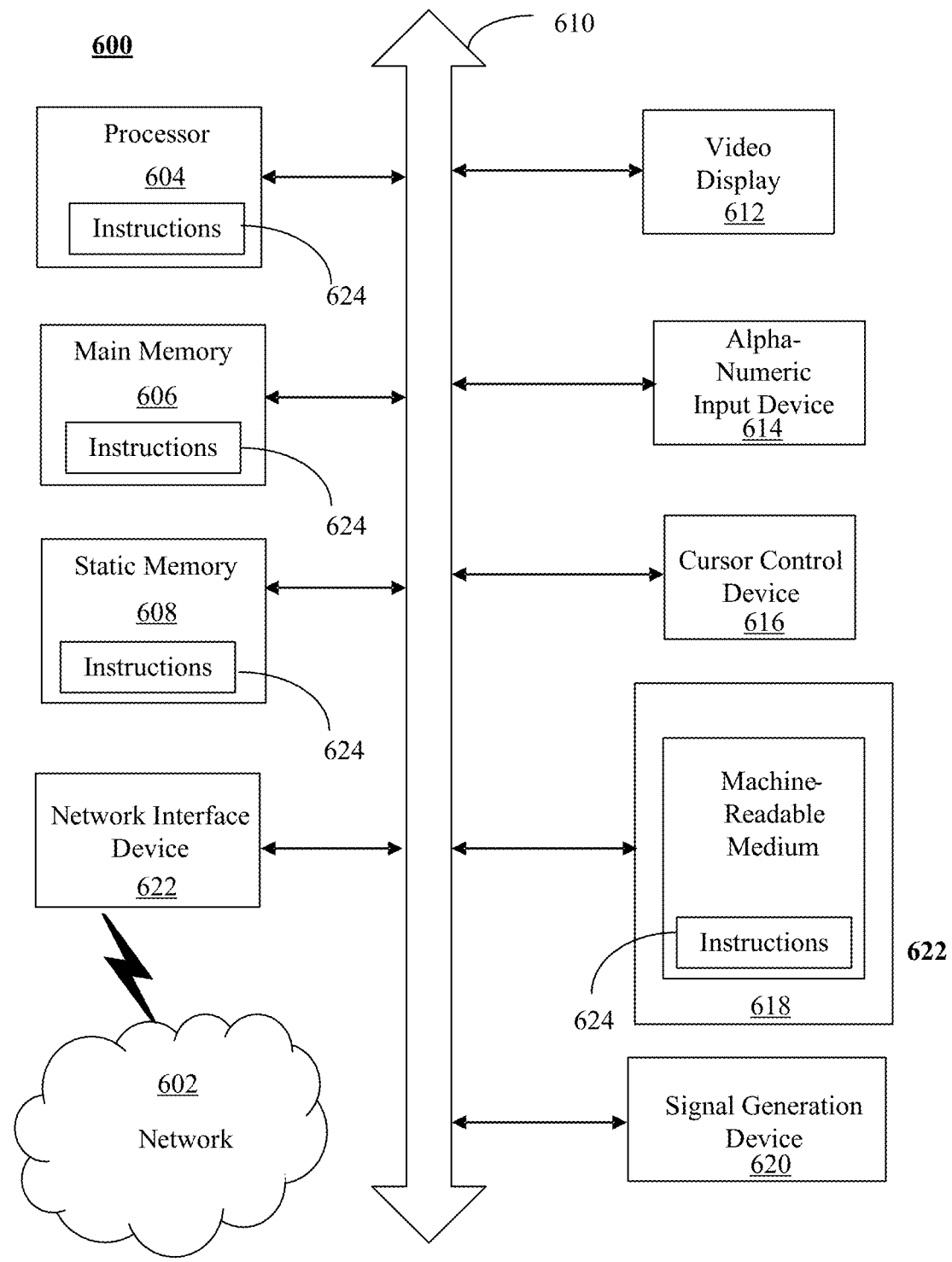
FIG. 6 depicts an exemplary communication system that provide wireless telecommunication services over wireless communication networks.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 602) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 600 may include a processor (or controller) 604 (e.g., a central processing unit (CPU)), a graphics processing unit (GPU, or both), a main memory 606 and a static memory 608, which communicate with each other via a bus 610. The computer system 600 may further include a display unit 612 (e.g., a liquid crystal display (LCD), a flat panel, or a solid state display). Computer system 600 may include an input device 614 (e.g., a keyboard), a cursor control device 616 (e.g., a mouse), a disk drive unit 618, a signal generation device 620 (e.g., a speaker or remote control) and a network interface device 622. In distributed environments, the embodiments described in the subject disclosure can be adapted to utilize multiple display units 612 controlled by two or more computer systems 600. In this configuration, presentations described by the subject disclosure may in part be shown in a first of display units 612, while the remaining portion is presented in a second of display units 612.

The disk drive unit 618 may include a tangible computer-readable storage medium 624 on which is stored one or more sets of instructions (e.g., software 626) embodying any one or more of the methods or functions described herein, including those methods illustrated above. Instructions 626 may also reside, completely or at least partially, within main memory 606, static memory 608, or within processor 604 during execution thereof by the computer system 600. Main memory 606 and processor 604 also may constitute tangible computer-readable storage media.

Figure 7:
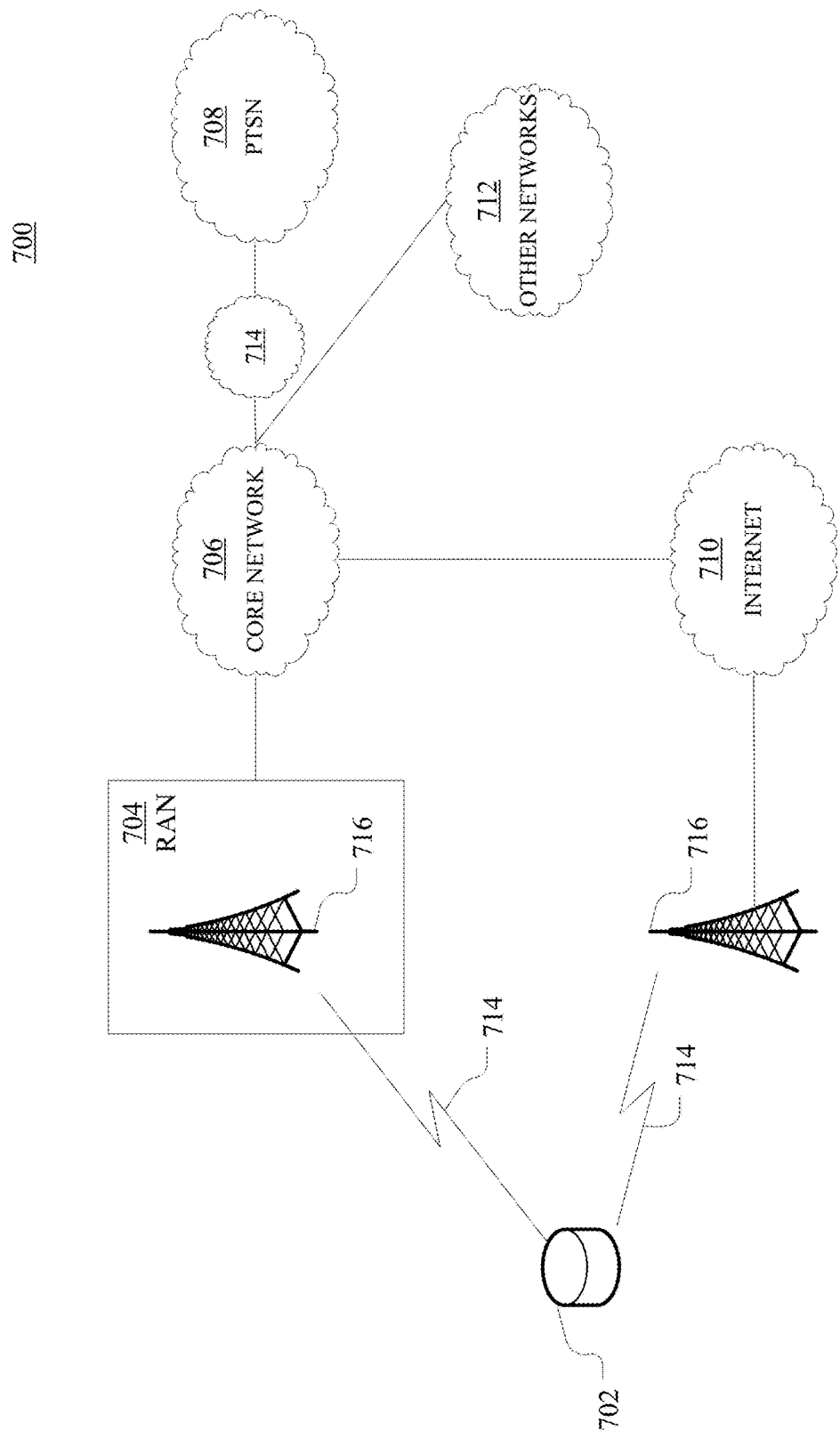
FIG. 7 is a diagram of an exemplary telecommunications system in which the disclosed methods and processes may be implemented.

As shown in FIG. 7, telecommunication system 700 may include wireless transmit/receive units (WTRUs) 702, a RAN 704, a core network 706, a public switched telephone network (PSTN) 708, the Internet 710, or other networks 712, though it will be appreciated that the disclosed examples contemplate any number of WTRUs, base stations, networks, or network elements. Each WTRU 702 may be any type of device configured to operate or communicate in a wireless environment. For example, a WTRU may comprise a mobile device, network device 400, or the like, or any combination thereof. By way of example, WTRUs 702 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 702 may be configured to transmit or receive wireless signals over an air interface 714.

Telecommunication system 700 may also include one or more base stations 716. Each of base stations 716 may be any type of device configured to wirelessly interface with at least one of the WTRUs 702 to facilitate access to one or more communication networks, such as core network 706, PTSN 708, Internet 710, or other networks 712. By way of example, base stations 716 may be a base transceiver station (BTS), a Node-B, an eNode B, a Home Node B, a Home eNode B, a site controller, an access point (AP), a wireless router, or the like. While base stations 716 are each depicted as a single element, it will be appreciated that base stations 716 may include any number of interconnected base stations or network elements.

RAN 704 may include one or more base stations 716, along with other network elements (not shown), such as a base station controller (BSC), a radio network controller (RNC), or relay nodes. One or more base stations 716 may be configured to transmit or receive wireless signals within a particular geographic region, which may be referred to as a cell (not shown). The cell may further be divided into cell sectors. For example, the cell associated with base station 716 may be divided into three sectors such that base station 716 may include three transceivers: one for each sector of the cell. In another example, base station 716 may employ multiple-input multiple-output (MIMO) technology and, therefore, may utilize multiple transceivers for each sector of the cell.

Base stations 716 may communicate with one or more of WTRUs 702 over air interface 714, which may be any suitable wireless communication link (e.g., RF, microwave, infrared (IR), ultraviolet (UV), or visible light). Air interface 714 may be established using any suitable radio access technology (RAT).

More specifically, as noted above, telecommunication system 700 may be a multiple access system and may employ one or more channel access schemes, such as CDMA, TDMA, FDMA, OFDMA, SC-FDMA, or the like. For example, base station 716 in RAN 704 and WTRUs 702 connected to RAN 704 may implement a radio technology such as Universal Mobile Telecommunications System (UMTS) Terrestrial Radio Access (UTRA) that may establish air interface 714 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 716 and WTRUs 702 that are connected to RAN 704 may implement a radio technology such as Evolved UMTS Terrestrial Radio Access (E-UTRA), which may establish air interface 714 using LTE or LTE-Advanced (LTE-A).

Optionally base station 716 and WTRUs 702 connected to RAN 704 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 716 may be a wireless router, Home Node B, Home eNode B, or access point, for example, and may utilize any suitable RAT for facilitating wireless connectivity in a localized area, such as a place of business, a home, a vehicle, a campus, or the like. For example, base station 716 and associated WTRUs 702 may implement a radio technology such as IEEE 602.11 to establish a wireless local area network (WLAN). As another example, base station 716 and associated WTRUs 702 may implement a radio technology such as IEEE 602.15 to establish a wireless personal area network (WPAN). In yet another example, base station 716 and associated WTRUs 702 may utilize a cellular-based RAT (e.g., WCDMA, CDMA2000, GSM, LTE, LTE-A, etc.) to establish a picocell or femtocell. As shown in FIG. 7, base station 716 may have a direct connection to Internet 710. Thus, base station 716 may not be required to access Internet 710 via core network 706.

RAN 704 may be in communication with core network 706, which may be any type of network configured to provide voice, data, applications, and/or voice over internet protocol (VoIP) services to one or more WTRUs 702. For example, core network 706 may provide call control, billing services, mobile location-based services, pre-paid calling, Internet connectivity, video distribution or high-level security functions, such as user authentication. Although not shown in FIG. 7, it will be appreciated that RAN 704 or core network 706 may be in direct or indirect communication with other RANs that employ the same RAT as RAN 704 or a different RAT. For example, in addition to being connected to RAN 704, which may be utilizing an E-UTRA radio technology, core network 706 may also be in communication with another RAN (not shown) employing a GSM radio technology.

Core network 706 may also serve as a gateway for WTRUs 702 to access PSTN 708, Internet 710, or other networks 712. PSTN 708 may include circuit-switched telephone networks that provide plain old telephone service (POTS). For LTE core networks, core network 706 may use IMS core 714 to provide access to PSTN 708. Internet 710 may include a global system of interconnected computer networks or devices that use common communication protocols, such as the transmission control protocol (TCP), user datagram protocol (UDP), or IP in the TCP/IP internet protocol suite. Other networks 712 may include wired or wireless communications networks owned or operated by other service providers. For example, other networks 712 may include another core network connected to one or more RANs, which may employ the same RAT as RAN 704 or a different RAT.

Some or all WTRUs 702 in telecommunication system 700 may include multi-mode capabilities. That is, WTRUs 702 may include multiple transceivers for communicating with different wireless networks over different wireless links. For example, one or more WTRUs 702 may be configured to communicate with base station 716, which may employ a cellular-based radio technology, and with base station 716, which may employ an IEEE 802 radio technology.

Figure 8:
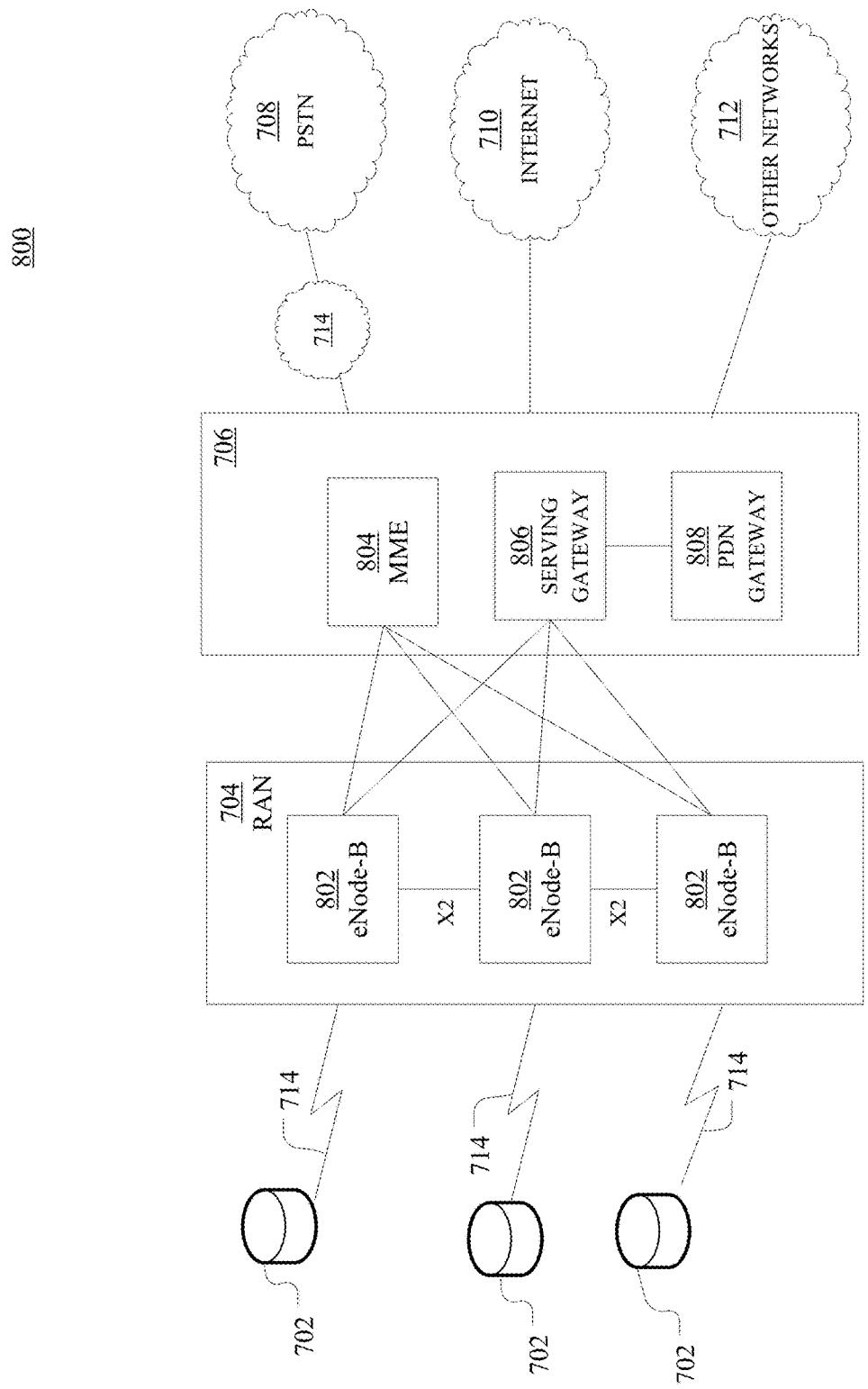
FIG. 8 is an example system diagram of a radio access network and a core network.

FIG. 8 is an example system 800 including RAN 704 and core network 706. As noted above, RAN 704 may employ an E-UTRA radio technology to communicate with WTRUs 702 over air interface 714. RAN 704 may also be in communication with core network 706.

RAN 704 may include any number of eNode-Bs 802 while remaining consistent with the disclosed technology. One or more eNode-Bs 802 may include one or more transceivers for communicating with the WTRUs 702 over air interface 714. Optionally, eNode-Bs 802 may implement MIMO technology. Thus, one of eNode-Bs 802, for example, may use multiple antennas to transmit wireless signals to, or receive wireless signals from, one of WTRUs 702.

Each of eNode-Bs 802 may be associated with a particular cell (not shown) and may be configured to handle radio resource management decisions, handover decisions, scheduling of users in the uplink or downlink, or the like. As shown in FIG. 8 eNode-Bs 802 may communicate with one another over an X2 interface.

Core network 706 shown in FIG. 8 may include a mobility management gateway or entity (MME) 804, a serving gateway 806, or a packet data network (PDN) gateway 808. While each of the foregoing elements are depicted as part of core network 706, it will be appreciated that any one of these elements may be owned or operated by an entity other than the core network operator.

MME 804 may be connected to each of eNode-Bs 802 in RAN 704 via an S1 interface and may serve as a control node. For example, MME 804 may be responsible for authenticating users of WTRUs 702, bearer activation or deactivation, selecting a particular serving gateway during an initial attach of WTRUs 702, or the like. MME 804 may also provide a control plane function for switching between RAN 704 and other RANs (not shown) that employ other radio technologies, such as GSM or WCDMA.

Serving gateway 806 may be connected to each of eNode-Bs 802 in RAN 704 via the S1 interface. Serving gateway 806 may generally route or forward user data packets to or from the WTRUs 702. Serving gateway 806 may also perform other functions, such as anchoring user planes during inter-eNode B handovers, triggering paging when downlink data is available for WTRUs 702, managing or storing contexts of WTRUs 702, or the like.

Serving gateway 806 may also be connected to PDN gateway 808, which may provide WTRUs 702 with access to packet-switched networks, such as Internet 710, to facilitate communications between WTRUs 702 and IP-enabled devices.

Core network 706 may facilitate communications with other networks. For example, core network 706 may provide WTRUs 702 with access to circuit-switched networks, such as PSTN 708, such as through IMS core 714, to facilitate communications between WTRUs 702 and traditional landline communications devices. In addition, core network 706 may provide the WTRUs 702 with access to other networks 712, which may include other wired or wireless networks that are owned or operated by other service providers.

Figure 9:
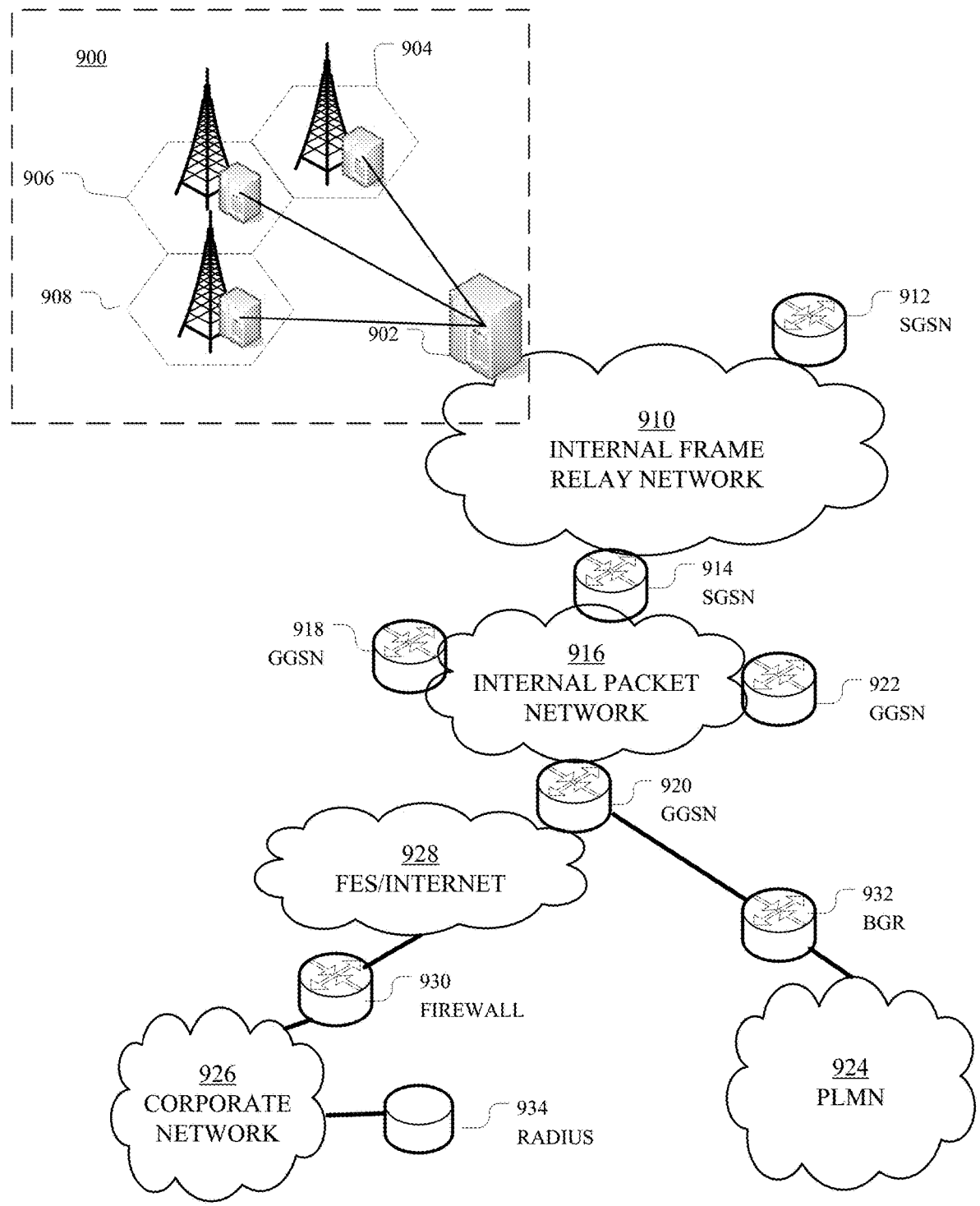
FIG. 9 depicts an overall block diagram of an example packet-based mobile cellular network environment, such as a general packet radio service (GPRS) network.

FIG. 9 depicts an overall block diagram of an example packet-based mobile cellular network environment, such as a GPRS network as described herein. In the example packet-based mobile cellular network environment shown in FIG. 9, there are a plurality of base station subsystems (BSS) 900 (only one is shown), each of which comprises a base station controller (BSC) 902 serving a plurality of BTSs, such as BTSs 904, 906, 908. BTSs 904, 906, 908 are the access points where users of packet-based mobile devices become connected to the wireless network. In example fashion, the packet traffic originating from mobile devices is transported via an over-the-air interface to BTS 908, and from BTS 908 to BSC 902. Base station subsystems, such as BSS 900, are a part of internal frame relay network 910 that can include a service GPRS support nodes (SGSN), such as SGSN 912 or SGSN 914. Each SGSN 912, 914 is connected to an internal packet network 916 through which SGSN 912, 914 can route data packets to or from a plurality of gateway GPRS support nodes (GGSN) 918, 920, 922. As illustrated, SGSN 914 and GGSNs 918, 920, 922 are part of internal packet network 916. GGSNs 918, 920, 922 mainly provide an interface to external IP networks such as PLMN 924, corporate intranets/internets 926, or Fixed-End System (FES) or the public Internet 928. As illustrated, subscriber corporate network 926 may be connected to GGSN 920 via a firewall 930. PLMN 924 may be connected to GGSN 920 via a boarder gateway router (BGR) 932. A Remote Authentication Dial-In User Service (RADIUS) server 934 may be used for caller authentication when a user calls corporate network 926.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 10:
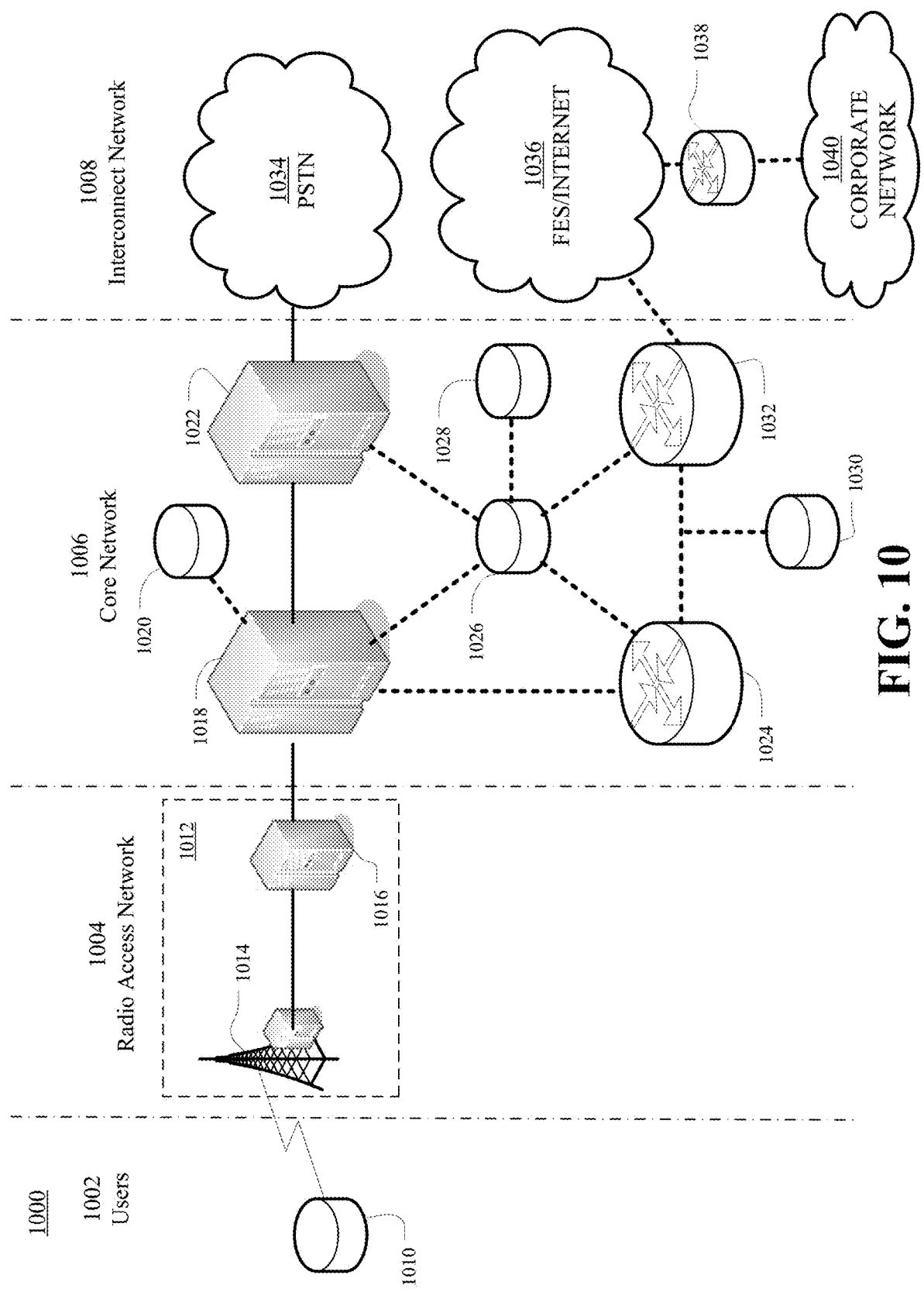
FIG. 10 illustrates an exemplary architecture of a GPRS network.

FIG. 10 illustrates an architecture of a typical GPRS network 1000 as described herein. The architecture depicted in FIG. 10 may be segmented into four groups: users 1002, RAN 1004, core network 1006, and interconnect network 1008. Users 1002 comprise a plurality of end users, who each may use one or more devices 1010. Note that device 1010 is referred to as a mobile subscriber (MS) in the description of network shown in FIG. 10. In an example, device 1010 comprises a communications device (e.g., mobile device, a mobile positioning center, a network device, a detected devices, a second device, access device (s), or the like, or any combination thereof). Radio access network 1004 comprises a plurality of BSSs such as BSS 1012, which includes a BTS 1014 and a BSC 1016. Core network 1006 may include a host of various network elements. As illustrated in FIG. 10, core network 1006 may comprise MSC 1018, service control point (SCP) 1020, gateway MSC (GMSC) 1022, SGSN 1024, home location register (HLR) 1026, authentication center (AuC) 1028, domain name system (DNS) server 1030, and GGSN 1032. Interconnect network 1008 may also comprise a host of various networks or other network elements. As illustrated in FIG. 10, interconnect network 1008 comprises a PSTN 1034, an FES/Internet 1036, a firewall 1038, or a corporate network 1040.

An MSC can be connected to a large number of BSCs. At MSC 1018, for instance, depending on the type of traffic, the traffic may be separated in that voice may be sent to PSTN 1034 through GMSC 1022, or data may be sent to SGSN 1024, which then sends the data traffic to GGSN 1032 for further forwarding.

When MSC 1018 receives call traffic, for example, from BSC 1016, it sends a query to a database hosted by SCP 1020, which processes the request and issues a response to MSC 1018 so that it may continue call processing as appropriate.

HLR 1026 is a centralized database for users to register to the GPRS network. HLR 1026 stores static information about the subscribers such as the International Mobile Subscriber Identity (IMSI), subscribed services, or a key for authenticating the subscriber. HLR 1026 also stores dynamic subscriber information such as the current location of the MS. Associated with HLR 1026 is AuC 1028, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 10, when MS 1010 initiates the attach process by turning on the network capabilities of the mobile device, an attach request is sent by MS 1010 to SGSN 1024. The SGSN 1024 queries another SGSN, to which MS 1010 was attached before, for the identity of MS 1010. Upon receiving the identity of MS 1010 from the other SGSN, SGSN 1024 requests more information from MS 1010. This information is used to authenticate MS 1010 together with the information provided by HLR 1026. Once verified, SGSN 1024 sends a location update to HLR 1026 indicating the change of location to a new SGSN, in this case SGSN 1024. HLR 1026 notifies the old SGSN, to which MS 1010 was attached before, to cancel the location process for MS 1010. HLR 1026 then notifies SGSN 1024 that the location update has been performed. At this time, SGSN 1024 sends an Attach Accept message to MS 1010, which in turn sends an Attach Complete message to SGSN 1024.

Next, MS 1010 establishes a user session with the destination network, corporate network 1040, by going through a Packet Data Protocol (PDP) activation process. Briefly, in the process, MS 1010 requests access to the Access Point Name (APN), for example, UPS.com, and SGSN 1024 receives the activation request from MS 1010. SGSN 1024 then initiates a DNS query to learn which GGSN 1032 has access to the UPS.com APN. The DNS query is sent to a DNS server within core network 1006, such as DNS server 1030, which is provisioned to map to one or more GGSNs in core network 1006. Based on the APN, the mapped GGSN 1032 can access requested corporate network 1040. SGSN 1024 then sends to GGSN 1032 a Create PDP Context Request message that contains necessary information. GGSN 1032 sends a Create PDP Context Response message to SGSN 1024, which then sends an Activate PDP Context Accept message to MS 1010.

Once activated, data packets of the call made by MS 1010 can then go through RAN 1004, core network 1006, and interconnect network 1008, in a particular FES/Internet 1036 and firewall 1038, to reach corporate network 1040.

Figure 11:
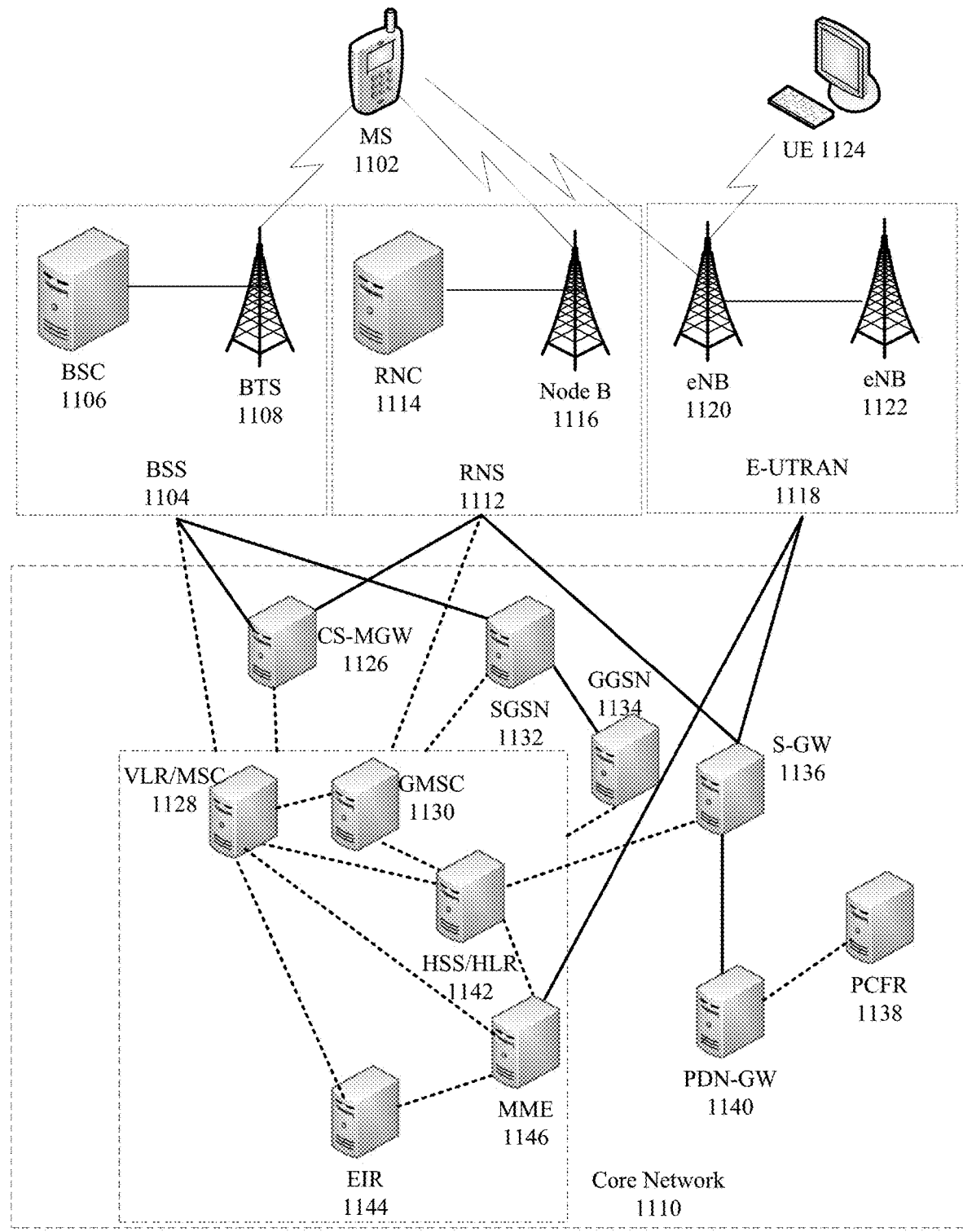
FIG. 11 is a block diagram of an exemplary public land mobile network (PLMN).

FIG. 11 illustrates a PLMN block diagram view of an example architecture that may be replaced by a telecommunications system. In FIG. 11, solid lines may represent user traffic signals, and dashed lines may represent support signaling. MS 1102 is the physical equipment used by the PLMN subscriber. For example, network device 400, the like, or any combination thereof may serve as MS 1102. MS 1102 may be one of, but not limited to, a cellular telephone, a cellular telephone in combination with another electronic device or any other wireless mobile communication device.

MS 1102 may communicate wirelessly with BSS 1104. BSS 1104 contains BSC 1106 and a BTS 1108. BSS 1104 may include a single BSC 1106/BTS 1108 pair (base station) or a system of BSC/BTS pairs that are part of a larger network. BSS 1104 is responsible for communicating with MS 1102 and may support one or more cells. BSS 1104 is responsible for handling cellular traffic and signaling between MS 1102 and a core network 1110. Typically, BSS 1104 performs functions that include, but are not limited to, digital conversion of speech channels, allocation of channels to mobile devices, paging, or transmission/reception of cellular signals.

Additionally, MS 1102 may communicate wirelessly with RNS 1112. RNS 1112 contains a Radio Network Controller (RNC) 1114 and one or more Nodes B 1116. RNS 1112 may support one or more cells. RNS 1112 may also include one or more RNC 1114/Node B 1116 pairs or alternatively a single RNC 1114 may manage multiple Nodes B 1116. RNS 1112 is responsible for communicating with MS 1102 in its geographically defined area. RNC 1114 is responsible for controlling Nodes B 1116 that are connected to it and is a control element in a UMTS radio access network. RNC 1114 performs functions such as, but not limited to, load control, packet scheduling, handover control, security functions, or controlling MS 1102 access to core network 1110.

An E-UTRA Network (E-UTRAN) 1118 is a RAN that provides wireless data communications for MS 1102 and UE 1124. E-UTRAN 1118 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1118 may include of series of logical network components such as E-UTRAN Node B (eNB) 1120 and E-UTRAN Node B (eNB) 1122. E-UTRAN 1118 may contain one or more eNBs. User equipment (UE) 1124 may be any mobile device capable of connecting to E-UTRAN 1118 including, but not limited to, a personal computer, laptop, mobile device, wireless router, or other device capable of wireless connectivity to E-UTRAN 1118. The improved performance of the E-UTRAN 1118 relative to a typical UMTS network allows for increased bandwidth, spectral efficiency, and functionality including, but not limited to, voice, high-speed applications, large data transfer or IPTV, while still allowing for full mobility.

Typically MS 1102 may communicate with any or all of BSS 1104, RNS 1112, or E-UTRAN 1118. In a illustrative system, each of BSS 1104, RNS 1112, and E-UTRAN 1118 may provide MS 1102 with access to core network 1110. Core network 1110 may include of a series of devices that route data and communications between end users. Core network 1110 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of 611 other packets in the PS domain and does not require dedicated network resources.

The circuit-switched MGW function (CS-MGW) 1126 is part of core network 1110, and interacts with VLRIMSC server 1128 and GMSC server 1130 in order to facilitate core network 1110 resource control in the CS domain. Functions of CS-MGW 1126 include, but are not limited to, media conversion, bearer control, payload processing or other mobile network processing such as handover or anchoring. CS-MGW 1126 may receive connections to MS 1102 through BSS 1104 or RNS 1112.

SGSN 1132 stores subscriber data regarding MS 1102 in order to facilitate network functionality. SGSN 1132 may store subscription information such as, but not limited to, the IMSI, temporary identities, or PDP addresses. SGSN 1132 may also store location information such as, but not limited to, GGSN address for each GGSN 1134 where an active PDP exists. GGSN 1134 may implement a location register function to store subscriber data it receives from SGSN 1132 such as subscription or location information.

Serving gateway (S-GW) 1136 is an interface which provides connectivity between E-UTRAN 1118 and core network 1110. Functions of S-GW 1136 include, but are not limited to, packet routing, packet forwarding, transport level packet processing, or user plane mobility anchoring for inter-network mobility. PCRF 1138 uses information gathered from P-GW 1136, as well as other sources, to make applicable policy and charging decisions related to data flows, network resources or other network administration functions. PDN gateway (PDN-GW) 1140 may provide user-to-services connectivity functionality including, but not limited to, GPRS/EPC network anchoring, bearer session anchoring and control, or IP address allocation for PS domain connections.

HSS 1142 is a database for user information and stores subscription data regarding MS 1102 or UE 1124 for handling calls or data sessions. Networks may contain one HSS 1142 or more if additional resources are required. Example data stored by HSS 1142 include, but is not limited to, user identification, numbering or addressing information, security information, or location information. HSS 1142 may also provide call or session establishment procedures in both the PS and CS domains.

VLR/MSC Server 1128 provides user location functionality. When MS 1102 enters a new network location, it begins a registration procedure. A MSC server for that location transfers the location information to the VLR for the area. A VLR and MSC server may be located in the same computing environment, as is shown by VLR/MSC server 1128, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1102 registration or procedures for handover of MS 1102 to a different section of core network 1110. GMSC server 1130 may serve as a connection to alternate GMSC servers for other MSs in larger networks.

EIR 1144 is a logical element which may store the IMEI for MS 1102. User equipment may be classified as either "white listed" or "black listed" depending on its status in the network. If MS 1102 is stolen and put to use by an unauthorized user, it may be registered as "black listed" in EIR 1144, preventing its use on the network. A MME 1146 is a control node which may track MS 1102 or UE 1124 if the devices are idle. Additional functionality may include the ability of MME 1146 to contact idle MS 1102 or UE 1124 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While particular arrangements are described herein, it is understood that physical functions in wireless communications networks may be modeled as a "pnf" while the virtualized components could be modeled as a "vnf". Model-based graphs can be applied to wireless network environments and many others and beyond telecommunications, and aspects provided herein are intended to support a small group of examples, rather than limit the scope or spirit of the disclosure.

Figure 12:
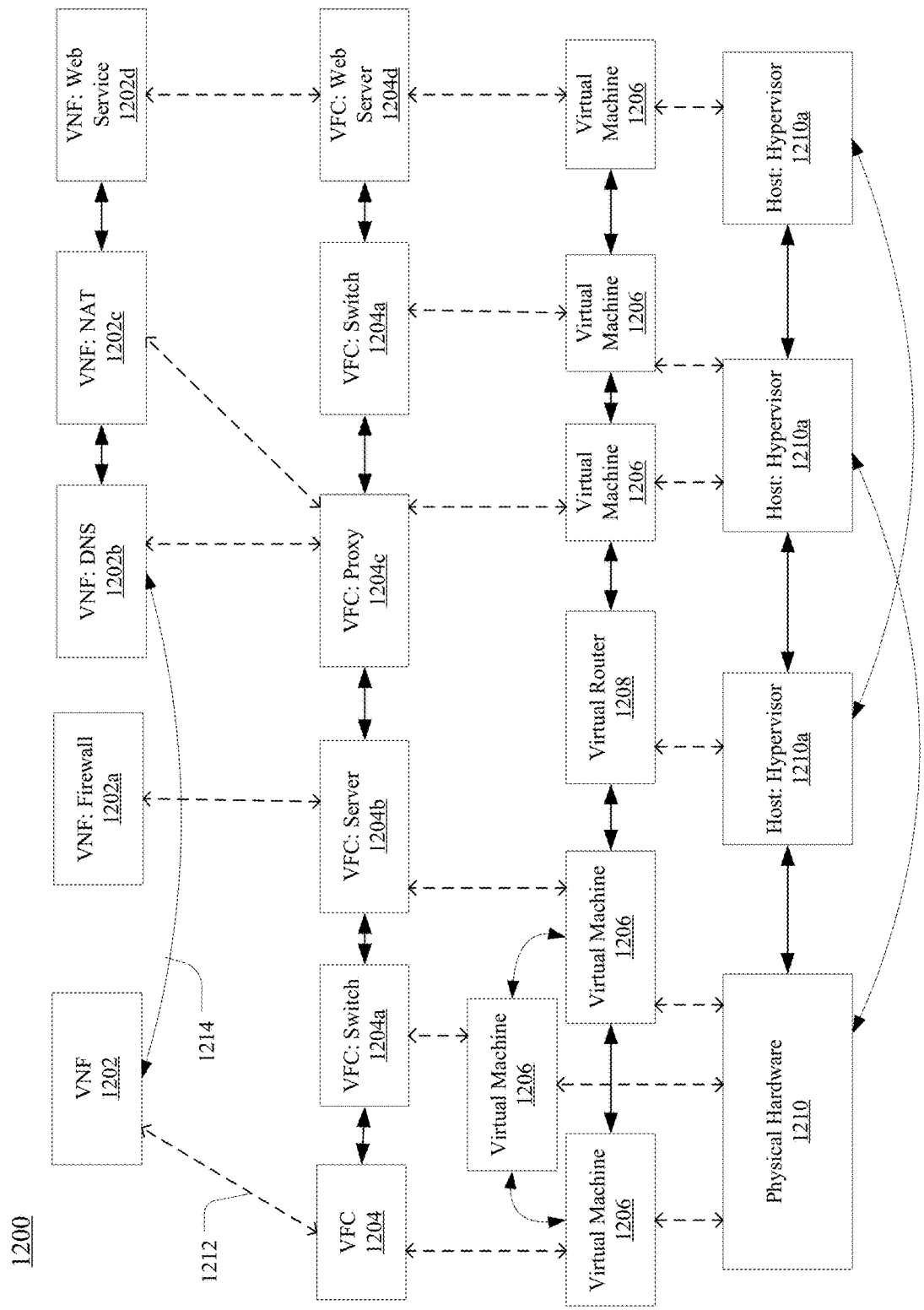
FIG. 12 illustrates a representation of an example network including virtual network functions.

FIG. 12 is a representation of an exemplary network 1200. Network 1200 may comprise an SDN—that is, network 1200 may include one or more virtualized functions implemented on general purpose hardware, such as in lieu of having dedicated hardware for every network function. That is, general purpose hardware of network 1200 may be configured to run virtual network elements to support communication services, such as mobility services, including consumer services and enterprise services. These services may be provided or measured in sessions.

Aspects of FIG. 12 illustrate virtual networks and virtual network functions. Virtual Functions, VFs, and or Virtual Network Functions, VNFs, can provide multiple network functions within one VF or leverage the concept of Virtual Function Components/Virtual Network Function Components, VFCs/VNFCs. A VF can be separated into zero or more VFCs and a VFs and VFCs can run on a virtual machine. Virtual machines, through the use of a hypervisor, can run on physical hardware.

A virtual network functions (VNFs) 1202 may be able to support a limited number of sessions. Each VNF 1202 may have a VNF type that indicates its functionality or role. For example, FIG. 12 illustrates a firewall VNF 1202a DNS VNF 1202b. Additionally or alternatively, VNFs 1202 may include other types of VNFs. VNFs can, for example, provide policy and charging rule function (PCRF). Each VNF 1202 may use one or more virtual machines (VMs) 1204 to operate. Each VM 1204 may have a VM type that indicates its functionality or role. For example, FIG. 12 illustrates a MCM VM 1204a, an ASM VM 1204b, and a DEP VM 1204c. Additionally or alternatively, VMs 1204 may include other types of VMs. Each VM 1204 may consume various network resources from a hardware platform 1206, such as a resource 1208, a virtual central processing unit (vCPU) 1208a, memory 1208b, or a network interface card (NIC) 1208c. Additionally or alternatively, hardware platform 1206 may include other types of resources 1208.

While FIG. 12 illustrates resources 1208 as collectively contained in hardware platform 1206, the configuration of hardware platform 1206 may isolate, for example, certain memory 1208c from other memory 1208c.

Hardware platform 1206 may comprise one or more chasses 1210. Chassis 1210 may refer to the physical housing or platform for multiple servers or other network equipment. In an aspect, chassis 1210 may also refer to the underlying network equipment. Chassis 1210 may include one or more servers 1212. Server 1212 may comprise general purpose computer hardware or a computer. In an aspect, chassis 1210 may comprise a metal rack, and servers 1212 of chassis 1210 may comprise blade servers that are physically mounted in or on chassis 1210.

Each server 1212 may include one or more network resources 1208, as illustrated. Servers 1212 may be communicatively coupled together (not shown) in any combination or arrangement. For example, all servers 1212 within a given chassis 1210 may be communicatively coupled. As another example, servers 1212 in different chasses 1210 may be communicatively coupled. Additionally or alternatively, chasses 1210 may be communicatively coupled together (not shown) in any combination or arrangement.

The characteristics of each chassis 1210 and each server 1212 may differ. Additionally or alternatively, the type or number of resources 1210 within each server 1212 may vary.

In an aspect, chassis 1210 may be used to group servers 1212 with the same resource characteristics. In another aspect, servers 1212 within the same chassis 1210 may have different resource characteristics.

Given hardware platform 1206, the number of sessions that may be instantiated may vary depending upon how efficiently resources 1208 are assigned to different VMs 1204. For example, assignment of VMs 1204 to particular resources 1208 may be constrained by one or more rules. For example, a first rule may require that resources 1208 assigned to a particular VM 1204 be on the same server 1212 or set of servers 1212. For example, if VM 1204 uses eight vCPUs 1208a, 1 GB of memory 1208b, and 2 NICs 1208c, the rules may require that all of these resources 1208 be sourced from the same server 1212. Additionally or alternatively, VM 1204 may require splitting resources 1208 among multiple servers 1212, but such splitting may need to conform with certain restrictions. For example, resources 1208 for VM 1204 may be able to be split between two servers 1212. Default rules may apply. For example, a default rule may require that all resources 1208 for a given VM 1204 must come from the same server 1212.

An affinity rule may restrict assignment of resources 1208 for a particular VM 1204 (or a particular type of VM 1204). For example, an affinity rule may require that certain VMs 1204 be instantiated on (that is, consume resources from) the same server 1212 or chassis 1210. For example, if VNF 1202 uses six MCM VMs 1204a, an affinity rule may dictate that those six MCM VMs 1204a be instantiated on the same server 1212 (or chassis 1210). As another example, if VNF 1202 uses MCM VMs 1204a, ASM VMs 1204b, and a third type of VMs 1204, an affinity rule may dictate that at least the MCM VMs 1204a and the ASM VMs 1204b be instantiated on the same server 1212 (or chassis 1210). Affinity rules may restrict assignment of resources 1208 based on the identity or type of resource 1208, VNF 1202, VM 1204, chassis 1210, server 1212, or any combination thereof.

An anti-affinity rule may restrict assignment of resources 1208 for a particular VM 1204 (or a particular type of VM 1204). In contrast to an affinity rule—which may require that certain VMs 1204 be instantiated on the same server 1212 or chassis 1210—an anti-affinity rule requires that certain VMs 1204 be instantiated on different servers 1212 (or different chasses 1210). For example, an anti-affinity rule may require that MCM VM 1204a be instantiated on a particular server 1212 that does not contain any ASM VMs 1204b. As another example, an anti-affinity rule may require that MCM VMs 1204a for a first VNF 1202 be instantiated on a different server 1212 (or chassis 1210) than MCM VMs 1204a for a second VNF 1202. Anti-affinity rules may restrict assignment of resources 1208 based on the identity or type of resource 1208, VNF 1202, VM 1204, chassis 1210, server 1212, or any combination thereof.

Within these constraints, resources 1208 of hardware platform 1206 may be assigned to be used to instantiate VMs 1204, which in turn may be used to instantiate VNFs 1202, which in turn may be used to establish sessions. The different combinations for how such resources 1208 may be assigned may vary in complexity and efficiency. For example, different assignments may have different limits of the number of sessions that can be established given a particular hardware platform 1206.

For example, consider a session that may require gateway VNF 1202a and PCRF VNF 1202b. Gateway VNF 1202a may require five VMs 1204 instantiated on the same server 1212, and PCRF VNF 1202b may require two VMs 1204 instantiated on the same server 1212. (Assume, for this example, that no affinity or anti-affinity rules restrict whether VMs 1204 for PCRF VNF 1202*b* may or must be instantiated on the same or different server 1212 than VMs 1204 for gateway VNF 1202*a*.) In this example, each of two servers 1212 may have sufficient resources 1208 to support 10 VMs 1204. To implement sessions using these two servers 1212, first server 1212 may be instantiated with 10 VMs 1204 to support two instantiations of gateway VNF 1202*a*, and second server 1212 may be instantiated with 9 VMs: five VMs 1204 to support one instantiation of gateway VNF 1202*a* and four VMs 1204 to support two instantiations of PCRF VNF 1202*b*. This may leave the remaining resources 1208 that could have supported the tenth VM 1204 on second server 1212 unused (and unusable for an instantiation of either a gateway VNF 1202*a* or a PCRF VNF 1202*b*). Alternatively, first server 1212 may be instantiated with 10 VMs 1204 for two instantiations of gateway VNF 1202*a* and second server 1212 may be instantiated with 10 VMs 1204 for five instantiations of PCRF VNF 1202*b*, using all available resources 1208 to maximize the number of VMs 1204 instantiated.

Consider, further, how many sessions each gateway VNF 1202*a* and each PCRF VNF 1202*b* may support. This may factor into which assignment of resources 1208 is more efficient. For example, consider if each gateway VNF 1202*a* supports two million sessions, and if each PCRF VNF 1202*b* supports three million sessions. For the first configuration—three total gateway VNFs 1202*a* (which satisfy the gateway requirement for six million sessions) and two total PCRF VNFs 1202*b* (which satisfy the PCRF requirement for six million sessions)—would support a total of six million sessions. For the second configuration—two total gateway VNFs 1202*a* (which satisfy the gateway requirement for four million sessions) and five total PCRF VNFs 1202*b* (which satisfy the PCRF requirement for 15 million sessions)—would support a total of four million sessions. Thus, while the first configuration may seem less efficient looking only at the number of available resources 1208 used (as resources 1208 for the tenth possible VM 1204 are unused), the second configuration is actually more efficient from the perspective of being the configuration that can support more the greater number of sessions.

To solve the problem of determining a capacity (or, number of sessions) that can be supported by a given hardware platform 1205, a given requirement for VNFs 1202 to support a session, a capacity for the number of sessions each VNF 1202 (e.g., of a certain type) can support, a given requirement for VMs 1204 for each VNF 1202 (e.g., of a certain type), a give requirement for resources 1208 to support each VM 1204 (e.g., of a certain type), rules dictating the assignment of resources 1208 to one or more VMs 1204 (e.g., affinity and anti-affinity rules), the chasses 1210 and servers 1212 of hardware platform 1206, and the individual resources 1208 of each chassis 1210 or server 1212 (e.g., of a certain type), an integer programming problem may be formulated.

First, a plurality of index sets may be established. For example, index set L may include the set of chasses 1210. For example, if a system allows up to 6 chasses 1210, this set may be:
L={1, 2, 3, 4, 5, 6},
where l is an element of L.

Another index set J may include the set of servers 1212. For example, if a system allows up to 16 servers 1212 per chassis 1210, this set may be:
J={1, 2, 3, . . . , 16},
where j is an element of J.

As another example, index set K having at least one element k may include the set of VNFs 1202 that may be considered. For example, this index set may include all types of VNFs 1202 that may be used to instantiate a service. For example, let
K={GW, PCRF}
where GW represents gateway VNFs 1202*a* and PCRF represents PCRF VNFs 1202*b*.

Another index set I(k) may equal the set of VMs 1204 for a VNF 1202 k. Thus, let
I(GW)={MCM, ASM, IOM, WSM, CCM, DCM}
represent VMs 1204 for gateway VNF 1202*a*, where MCM represents MCM VM 1204*a*, ASM represents ASM VM 1204*b*, and each of IOM, WSM, CCM, and DCM represents a respective type of VM 1204. Further, let
I(PCRF)={DEP, DIR, POL, SES, MAN}
represent VMs 1204 for PCRF VNF 1202*b*, where DEP represents DEP VM 1204*c* and each of DIR, POL, SES, and MAN represent a respective type of VM 1204.

Another index set V may include the set of possible instances of a given VM 1204. For example, if a system allows up to 20 instances of VMs 1202, this set may be:
V={1, 2, 3, . . . , 20},
where v is an element of V.

In addition to the sets, the integer programming problem may include additional data. The characteristics of VNFs 1202, VMs 1204, chasses 1210, or servers 1212 may be factored into the problem. This data may be referred to as parameters. For example, for given VNF 1202 k, the number of sessions that VNF 1202 k can support may be defined as a function S(k). In an aspect, for an element k of set K, this parameter may be represented by
S(k)>=0;
is a measurement of the number of sessions k can support. Returning to the earlier example where gateway VNF 1202*a* may support 2 million sessions, then this parameter may be S(GW)=2,000,000.

VM 1204 modularity may be another parameter in the integer programming problem. VM 1204 modularity may represent the VM 1204 requirement for a type of VNF 1202. For example, for k that is an element of set K and i that is an element of set I, each instance of VNF k may require M(k, i) instances of VMs 1204. For example, recall the example where
I(GW)={MCM, ASM, IOM, WSM, CCM, DCM}.
In an example, M(GW, I(GW)) may be the set that indicates the number of each type of VM 1204 that may be required to instantiate gateway VNF 1202*a*. For example,
M(GW, I(GW))={2, 16, 4, 4, 2, 4}
may indicate that one instantiation of gateway VNF 1202*a* may require two instantiations of MCM VMs 1204*a*, 16 instantiations of ACM VM 1204*b*, four instantiations of IOM VM 1204, four instantiations of WSM VM 1204, two instantiations of CCM VM 1204, and four instantiations of DCM VM 1204.

Another parameter may indicate the capacity of hardware platform 1206. For example, a parameter C may indicate the number of vCPUs 1208*a* required for each VM 1204 type i and for each VNF 1202 type k. For example, this may include the parameter C(k, i).

For example, if MCM VM 1204*a* for gateway VNF 1202*a* requires 20 vCPUs 1208*a*, this may be represented as C(GW, MCM)=20.

However, given the complexity of the integer programming problem—the numerous variables and restrictions that must be satisfied—implementing an algorithm that may be used to solve the integer programming problem efficiently, without sacrificing optimality, may be difficult.

While examples of a telecommunications system in which communication can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While examples of data structures, network environments, and other aspects relevant to the inventions herein, have been described in connection with various computing devices/processors, the underlying concepts may be applied to other environments, networks, computing devices, processors, or systems subject to similar requirements and constraints. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The systems, methods, and/or techniques associated with graph structures described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While techniques herein are described in connection with the various examples of the various figures, it is to be understood that other similar implementations may be used, or modifications and additions may be made to the described example techniques, without deviating from the scope or spirit of the innovation. For example, one skilled in the art will recognize that graph structure techniques herein may apply to environments other than those expressly identified, whether wired or wireless, and may be applied to any number of such environments via a communications network and interacting across the network. Therefore, model-driven graph structures as described herein should not be limited to any single example, but rather should be construed in breadth and scope in accordance with the appended claims and the entirety of the disclosure.

In describing preferred methods, systems, or apparatuses of the subject matter of the present disclosure—model-driven graph structures and systems or methods utilizing such—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed is:
1. A system comprising:
a processor; and non-transitory computer-readable media storing computer-readable instructions that, when executed by the processor, cause the processor to perform a method of:
receiving a first node schema definition associated with a first object and a second node schema definition associated with a second object;
receiving first object data associated with the first object and second object data associated with the second object;
populating the first object data to a model first node according to the first node schema definitions; and
populating the second object data to a model second node according to the second node schema definition;
receiving a first edge schema definition associated with a first edge between the first object and the second object;
receiving relationship data associated with the first object and the second object;
populating the relationship data to a model first edge according to the first edge schema definition, the model first edge is an instance of a first edge schema;
defining a model-driven graph structure according to at least the model first node and the model second node connected by the model first edge;
defining valid attributes for edge types associated with the model first edge;
defining valid edges between node types associated with the model first node and the model second node;
receiving an update to one of a first node schema, a second node schema, or the first edge schema;
propagating the update to the one of the first node schema, the second node schema, or the first edge schema through the model-driven graph structure; and
populating the first object data, the second object, and relationship data relating to the one of the first node schema, the second node schema, or the first edge schema to one of a new first node schema, a new second node schema, or a new first edge schema.

2. The system of claim 1, the first node schema, second node schema, and the first edge schema include rules for populating the model first node, the model second node, and the model first edge.

3. The system of claim 1, the non-transitory computer-readable media storing computer-readable instructions that, when executed by the processor, cause the processor to perform a method further comprising:
comparing the relationship data to relationship rules of the model-driven graph structure; and
modifying the relationship data to conform to the relationship rules of the model-driven graph structure.

4. The system of claim 1, the first node schema, second node schema, and the first edge schema include context tags.

5. The system of claim 1, the first node schema, second node schema, and the first edge schema include an instance entity.

6. The system of claim 1, the non-transitory computer-readable media storing computer-readable instructions that, when executed by the processor, cause the processor to perform a method further comprising:
receiving data from an application programming interface configured to interact with the model-driven graph structure.

7. The system of claim 1, the first node schema, the second node schema, and the first edge schema are defined according to representational state transfer compliant language.

8. The system of claim 1, the first node schema definition defines a model logical element, and the second node schema definition defines a model physical element.

9. A system, comprising:
a processor;
a non-transitory computer-readable media storing executable instructions that when executed by the processor cause the processor to effectuate operations; and
a model-driven graph stored on the non-transitory computer-readable media, wherein the model-driven graph comprises:
a first model object representing a first object in the model-driven graph, the first model object described according to a first node schema definition and first object data associated with the first object;
a second model object representing a second object in the model-driven graph, the second model object described according to a second node schema definition and second object data associated with the second object;
a first model edge between the first model object and the second model object in the model-driven graph, the first model edge described according to a first edge schema definition and relationship data associated with the first object and the second object; and
at least one governance constraint of the model-driven graph, the at least one governance constraint defining at least validity and relationship of instances for a first node schema, a second node schema, or a first edge schema,
wherein the model-driven graph is compliant with a representational state transfer model and is used with an application programming interface configured to communicate with the model-driven graph.

10. The system of claim 9, wherein the operations comprise generating a framework or modifying a framework using the model-driven graph.

11. The system of claim 9, wherein the operations comprise updating the model-driven graph in response to one or more changes to the first node schema, the second node schema, or the first edge schema, wherein the first node schema, the second node schema, and the first edge schema include rules for populating a model first node, a model second node, and a model first edge.

12. The system of claim 9, the first node schema, the second node schema, and the first edge schema include context tags.

13. The system of claim 9, the first node schema, the second node schema, and the first edge schema include an instance entity.

14. The system of claim 9, the first node schema, the second node schema, and the first edge schema are defined according to representational state transfer compliant language.

15. A method, comprising:
receiving a first node schema definition associated with a first object and a second node schema definition associated with a second object;
receiving first object data associated with the first object and second object data associated with the second object;
populating the first object data to a model first node according to the first node schema definition and the second object data to a model second node according to the second node schema definition;

receiving a first edge schema definition associated with a first edge between the first object and the second object;

receiving relationship data associated with the first object and the second object;

populating the first object data to a model first node according to the first node schema definitions; and populating the second object data to a model second node according to the second node schema definition;

receiving a first edge schema definition associated with a first edge between the first object and the second object;

receiving relationship data associated with the first object and the second object;

populating the relationship data to a model first edge according to the first edge schema definition, the model first edge is an instance of a first edge schema;

defining a model-driven graph structure according to at least the model first node and the model second node connected by the model first edge;

defining valid attributes for edge types associated with the model first edge;

defining valid edges between node types associated with the model first node and the model second node;

receiving an update to one of a first node schema, a second node schema, or the first edge schema;

propagating the update to the one of the first node schema, the second node schema, or the first edge schema through the model-driven graph structure; and populating the first object data, the second object, and relationship data relating to the one of the first node schema, the second node schema, or the first edge schema to one of a new first node schema, a new second node schema, or a new first edge schema.

16. The method of claim 15, further comprising receiving data from an application programming interface configured to interact with the model-driven graph structure.

17. The system of claim 1, the non-transitory computer-readable media storing computer-readable instructions that, when executed by the processor, cause the processor to perform a method further comprising defining one or more validity rules for each of the first node schema, the second node schema, and the first edge schema, wherein the one or more validity rules specify or constrain the valid attributes for the first edge schema and the one or more validity rules specify or constrain the valid edges between node types.

18. The system of claim 1, the non-transitory computer-readable media storing computer-readable instructions that, when executed by the processor, cause the processor to perform a method further comprising:

receiving an update to a governance of the model-driven graph structure;

evaluating rules or constraints associated with the model-driven graph structure by checking relationships between graph elements within the model-driven graph structure; and determining whether the relationships between the graph elements comply with the update to the governance of the model-driven graph structure.

19. The system of claim 18, the non-transitory computer-readable media storing computer-readable instructions that, when executed by the processor, cause the processor to perform a method further comprising:

based on a determination that the relationships between the graph elements do not comply with the update to the governance of the model-driven graph structure, modifying relationships or other model aspects of the model-driven graph structure based on the update to the governance of the model-driven graph structure.

* * * * *